(12) United States Patent
Abu-Ageel

(10) Patent No.: US 6,888,662 B2
(45) Date of Patent: May 3, 2005

(54) MICRO-MECHANICAL SYSTEM EMPLOYING ELECTROSTATIC ACTUATOR AND FABRICATION METHODS OF SAME

(76) Inventor: Nayef M. Abu-Ageel, 45K Rolling Green Dr., Fall River, MA (US) 02720

(*) Notice: Subject to any disclaimer, the term of this patent is extended or adjusted under 35 U.S.C. 154(b) by 0 days.

(21) Appl. No.: 10/436,777

(22) Filed: May 13, 2003

(65) Prior Publication Data
US 2004/0036942 A1 Feb. 26, 2004

Related U.S. Application Data

(63) Continuation of application No. 10/315,366, filed on Dec. 10, 2002, now Pat. No. 6,757,092.
(60) Provisional application No. 60/338,917, filed on Dec. 10, 2001, and provisional application No. 60/380,250, filed on May 13, 2002.

(51) Int. Cl.[7] .............................. G02B 26/00; H02N 1/00
(52) U.S. Cl. ..................... 359/290; 310/309; 73/504.09
(58) Field of Search ................................ 359/290, 291, 359/295, 298, 223, 224, 230, 322; 257/414; 438/52; 310/309; 73/504.09, 504.12, 504.14, 504.02, 514.16

(56) References Cited

U.S. PATENT DOCUMENTS 5,362,213 A  *  11/1994  Komatsu et al. ............ 417/418
5,969,848 A     10/1999  Lee et al. ................... 359/298
6,407,851 B1     6/2002  Islam et al. ................. 359/291
6,593,677 B2     7/2003  Behin et al. ................ 310/309

FOREIGN PATENT DOCUMENTS

| WO | WO 01/73934 A2 | 10/2001 |
| WO | WO 01/73935 A2 | 10/2001 |
| WO | WO 01/73936 A2 | 10/2001 |
| WO | WO 01/73937 A2 | 10/2001 |
| WO | WO 01/74707 A2 | 10/2001 |
| WO | WO 01/76055 A2 | 10/2001 |

* cited by examiner

Primary Examiner—Hung Xuan Dang
Assistant Examiner—Tuyen Tra
(74) Attorney, Agent, or Firm—Gavrilovich, Dodd & Lindsey, LLP

(57) ABSTRACT

A vertical electrostatic actuator is based on a layered structure consisting of two conducting or semiconducting layers separated by an insulating layer and/or layered structure consisting of p-type and n-type layers separated by a pn-junction. The number of conducting layers, p-type layers and/or n-type layers can be more than two as long as each two adjacent layers are separated by an insulating layer or a pn-junction. The mobile electrode of the actuator can be formed along a flexure in a micro-mechanical system. Two stationary electrodes are located on either side of the mobile electrode. The layered structure of the electrodes increases the torque on the flexure and thus improves the performance of the actuator. Fabrication methods for the electrostatic actuator and micro-mechanical systems employing the same are disclosed.

28 Claims, 39 Drawing Sheets

MICRO-MECHANICAL SYSTEM EMPLOYING ELECTROSTATIC ACTUATOR AND FABRICATION METHODS OF SAME

CROSS-REFERENCE TO RELATED APPLICATION

This application is a continuation of application Ser. No. 10/315,366, filed Dec. 10, 2002 now U.S. Pat. No. 6,757,092, which claims the benefit of prior Provisional Application Nos. 60/338,917 filed Dec. 10, 2001 and 60/380,250 filed on May 13, 2002. Each of these applications is fully incorporated by reference herein as though set forth in full.

TECHNICAL FIELD

The present invention generally relates to micro-electro mechanical systems (MEMS), and more particularly, to electrostatic actuators and micro-mechanical systems employing the same and methods for fabricating and operating such devices.

BACKGROUND

Micro-Electro-Mechanical Systems (MEMS) technology has been used increasingly in the development of many micro devices such as optical switches. MEMS technology utilizes lithographic mass fabrication processes used by the semiconductor industry in manufacturing integrated circuits (ICs). MEMS based switches consist of arrays of tiny mirrors and are found in two-dimensional (2D) and three-dimensional (3D) varieties. 2D MEMS based mirrors only can tilt in two positions, up or down, whereas 3D MEMS based mirrors can tilt in any direction.

Electrostatic actuators have been used to produce torsional motion of structures through the application of electrostatic force between stationary and mobile electrodes. The stationary electrode is usually attached to a substrate whereas the mobile electrode is attached to a torsional element or a torsional flexure, which is in turn attached to the torsional element. The flexure or mirror itself can serve as a mobile electrode if it is made from an electrically conducting material. The mobile electrode moves toward the stationary electrode once a bias voltage is applied between them. In known actuators, capacitive actuators that apply force directly on the torsional element itself provide a smaller rotational motion compared to the ones that apply force directly on the mirror's flexure. This is due to the larger gap size between both electrodes and the smaller angle of rotation that the mirror can have before it touches the bottom electrode in case of applying the force directly on the mirror itself.

FIGS. 1A–1C show perspective and cross sectional views of a prior art actuator 25 where the force is applied directly on the flexure itself. FIG. 1B shows a cross sectional view along line B of FIG. 1A, and FIG. 1C shows a cross sectional view along line C of FIG. 1A. The stationary electrodes 8 (FIG. 1C) apply the force directly on torsional flexures 4, which suspend the torsional element 2 and mirror 1 over a cavity 5. The mobile electrode 7 and torsional flexure 4 rotate together around rotation axis B and move toward the stationary electrode 8 upon the application of a bias voltage between both electrodes. The electrostatic force is inversely proportional to the square of the gap 9 between stationary 8 and mobile 7 electrodes while the maximum angle of rotation ∝ is directly proportional to the gap 9. An electrostatic actuator that applies force directly on the flexure itself is disclosed in U.S. Pat. No. 6,201,629B1 issued to R. W. McClelland et al.

In known electrostatic actuators, the voltage profile across the surface area of the stationary and mobile electrodes is uniform and its value is equal to the biasing voltage. Actuators that apply force directly on the mirror's flexure allow larger angles of rotation when compared to ones that apply force on the mirror itself. However, both types of actuators have non-linear actuation characteristics (i.e. non-linear variation of the angle of rotation with the applied voltage) and suffer from the conflicting demands of larger angle of rotation, lower actuation voltage, and higher switching speeds. In addition, both actuator types lacked the capability to create a non-uniform voltage profile across the electrode surface area and to dynamically change such voltage profile across the electrode surface area during operation. Providing such capability permits more versatile designs and/or larger rotational motion.

Therefore, there is a need for new types of rotating capacitive actuators and torsional micro-mirror systems to overcome the shortcomings of the prior art systems in terms of smaller size, higher resonant frequency, larger angle of rotation, lower actuation voltage, more precise position sensing, simpler fabrication methods, reducing the non-linearity of the actuation characteristics and providing a capability to dynamically change the voltage profile across the electrode surface area during operation.

SUMMARY OF THE INVENTION

It is an advantage of the present invention to provide an improved vertical electrostatic actuator and a micro-mirror system incorporating the same, as well as fabrication methods of such actuator and micro-mirror system. The invention can also provide an improved position sensor for use in micro-mechanical systems.

In accordance with an embodiment of the invention, a vertical electrostatic actuator is based on a layered structure consisting of two conducting or semiconducting layers separated by an insulating layer and/or layered structure which consisting of p-type and n-type layers separated by a pn-junction. The number of conducting layers, p-type layers and/or n-type layers can be more than two as long as each two adjacent layers are separated by an insulating layer or a pn-junction.

In accordance with a further embodiment of the invention, a pn-based vertical electrostatic actuator can include a p-type semiconducting layer on top of a n-type semiconducting layer or vice versa. The stationary and mobile electrodes have the same pn-structure. The pn-structure in the stationary electrode is reverse biased. Whereas in the mobile electrode, either the n-type or p-type layer is grounded in order to establish an electric field between the similar semiconducting types of the stationary and mobile electrodes. In this embodiment, the stationary electrode applies a torque on the mobile electrode resulting in a vertical and/or rotational motion.

In accordance with another embodiment of the invention, a micro-mirror system employs a combination of both vertical electrostatic actuators, such as those disclosed herein and vertical comb-drive actuators, such as those described in further detail herein. This unique micro-mirror system is potentially capable of higher resonance frequency, larger angle of rotation, lower actuation voltage, actuation characteristics with reduced non-linearity and/or more precise position sensors with less complex measurement schemes.

Other embodiments of the invention provide uni-axial and multi-axial systems employing both types of vertical electrostatic actuators, as well as fabrication methods and operational procedures for the actuators, position sensors, and micro-mechanical systems.

Other embodiments, features and advantages of the invention will be or will become apparent to one with skill in the art upon examination of the following figures and detailed description. It is intended that all such additional features, embodiments and advantages be included within this description, be within the scope of the invention, and be protected by the accompanying claims.

It is to be understood that the drawings are solely for purposes of illustration and not as a definition of the limits of the disclosure. Furthermore, it is to be understood that the drawings are not necessarily drawn to scale and that, unless otherwise stated, they are merely intended to conceptually illustrate the structures and methods described herein.

DETAILED DESCRIPTION

Described herein are: a vertical electrostatic actuator, a position sensor, a micro-mirror system and fabrication methods of such actuators, position sensor and micro-mirror system.

Figure 2A:
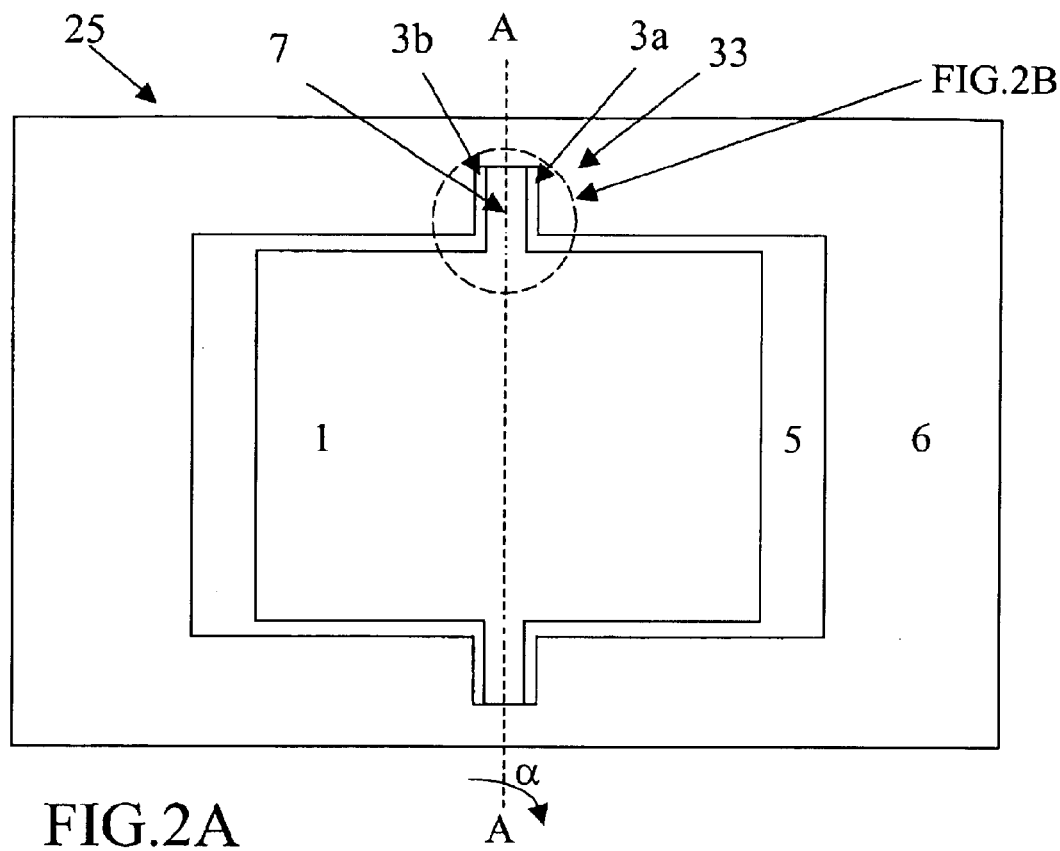
FIGS. 2A–2E show various simplified plan and cross-sectional views of a torsional micro-mirror system with a vertical electrostatic actuator acting directly on the flexures, in accordance with an embodiment of the present invention.
Figure 2B:
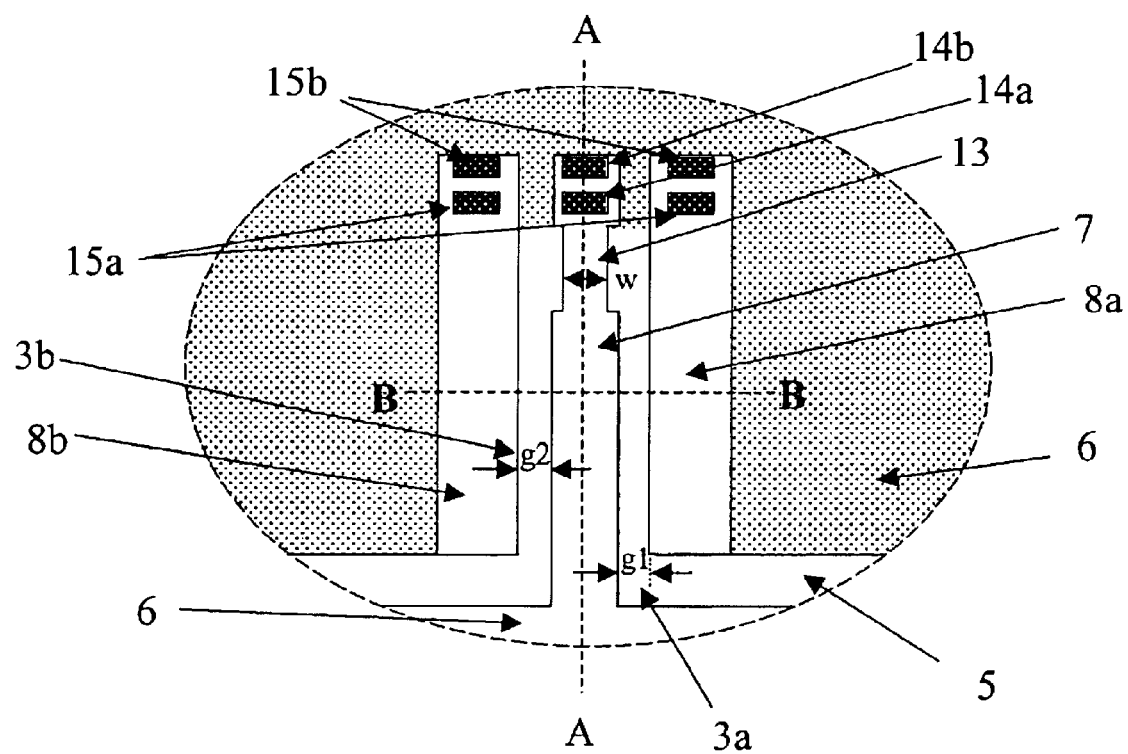
Figure 2C:
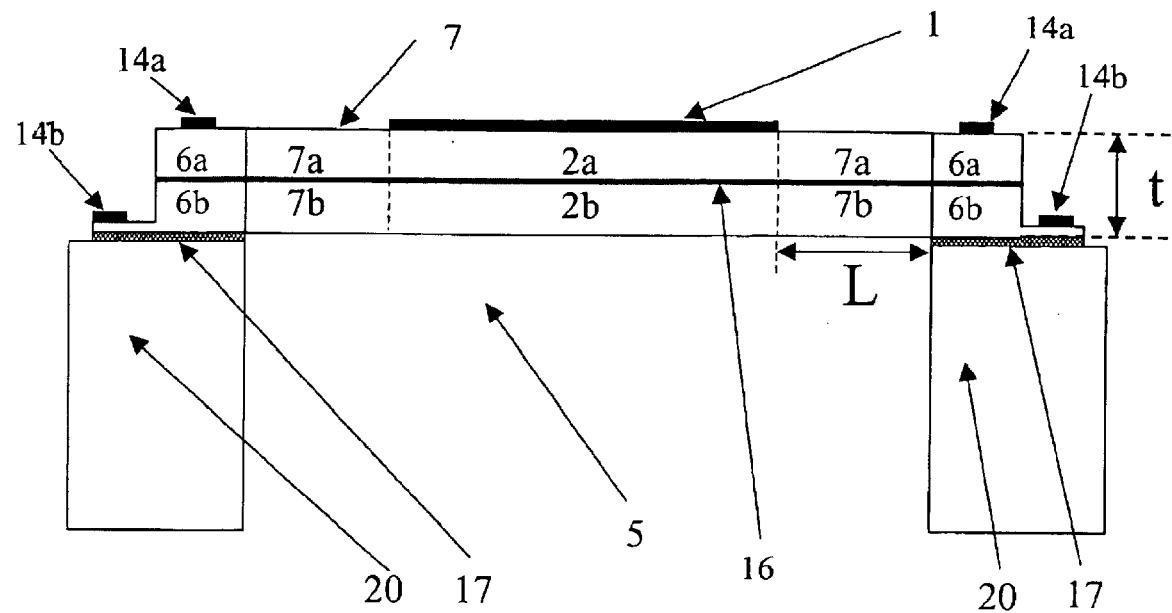

FIG. 2A shows a top plan view of one embodiment of a torsional micro-mirror system 25. FIG. 2B is a top plan view showing an enlargement of both the flexure 7 and the stationary structure 8, which are encircled in FIG. 2A. FIG. 2C shows a cross-sectional view of FIG. 2A taken along the centerline A.

In this embodiment, a vertical electrostatic actuator 33 includes, among other things, stationary structures 8a–b attached to a substrate 20 as shown in FIG. 2B and acting as stationary electrodes. The flexure 7, rotating element 2 and electrodes 8a–b comprise two conducting or semiconducting layers a and b separated by an insulating layer 16 as shown in FIG. 2C.

The flexure 7 acts as a mobile electrode. The rotating element 2 is suspended over a cavity 5 and connected to a base 6 by torsional flexures 7. The base 6 acts as a frame which holds the rotating element 2 and the flexures 7.

The cavity 5 is formed in the base 6 below and around both the rotating element 2 and the flexures 7 in order to permit the rotation of the mirror 1, which is formed on the rotating element 2, and flexures 7 about the flexures axis A.

The flexure 7 is necked down to a width w 13 (FIG. 2B) and thickness t (FIG. 2C). The flexure thickness t can be reduced to any desired value along the flexure length L or along some specific parts of the flexure length. Necked down flexures 7 reduce flexures 7 stiffness, which in turn increases the angle of rotation for a given torque exerted on flexures 7 by stationary electrodes 8. On the other hand, reducing flexures 7 stiffness leads to a lower resonance frequency, thus, a lower switching speed. The flexures 7 may be collinear and aligned with the rotating element 2 centerline A.

One advantage of vertical electrostatic actuators described herein over known electrostatic actuators is their capability to provide two stationary electrodes 8a and 8b for each flexure 7 which increases the torque applied on the mobile electrode 7, thus, potentially doubling the angle of rotation α of the mirror 1.

The gaps $g_1$ 3a and $g_2$ 3b between mobile 7 and stationary 8a and 8b electrodes can have equal or different sizes. Metal pads 14a,14b for layers a and b, respectively, of the mobile electrode (i.e. flexures) 7 and metal pads 15a, 15b for layers a and b, respectively, of the stationary electrode 8 are provided. The pads provide current to the mobile and stationary electrodes, respectively. These pads 14, 15, as well as the mobile 7 and stationary 8 electrodes are isolated from the substrate 20 by an insulating layer 17 such as silicon oxide, reverse biased pn-junction or an insulating air gap. Both the mobile electrode 7 and its metal pads 14 are isolated from both stationary electrodes 8a–b and its metal pads 15 by an insulating air gap.

The conducting layers a and b can be formed using metals such as Al, Au, and Ni as well as doped semiconductors such as silicon, polysilicon, SiC, and GaAs.

The insulating layers 16 and 17 can be formed using any insulating material such as silicon oxide and silicon nitride. The first insulating layer 16 provides electrical isolation between the conducting layers a and b while the second insulating layer 17 provides electrical isolation between the conducting layer b and the substrate 20 and acts as an etch stop for the conducting layers during the etch of the cavity 5.

The metal pads 14 and 15 can be made from metals that form ohmic contacts to conducting layers a and b. Metals such as Al, Al—Si (1% Si), and Al—Si—Cu (1% Si and 4% Cu) are usually used to form ohmic contacts to p-type Si and heavily doped n-type Si.

A reflective layer such as gold or aluminum can be deposited on top of a rotating element 2 to form a mirror 1. Deposition techniques such as sputtering, thermal or e-beam evaporation, plating and/or electroplating can be used to form the reflective mirror 1 and/or the metal pads 14 and 15. Alternatively, mirror 1 can be bonded to a rotating element 2. These bonded mirrors can have specific designs, provide optical power, or need fabrication steps that are difficult to include in the fabrication process of the micro-mirror system 25.

The flexures 7 may have various designs and shapes. For example, the flexures 7 may be rectangular flexures, I-shaped cross-section, T-shaped cross-section, torsion flexures, serpentine flexures, cantilever flexures, or one or more springs combined with pin-and-staple flexures. The restoring torque that counters the rotation of the rotating element 2 may be provided by the torsional stiffness of the flexures 7 or by the application of a counter force on the rotating element 2. For example, this force can be electrostatic, electromagnetic or piezoelectric force.

Figure 2D:
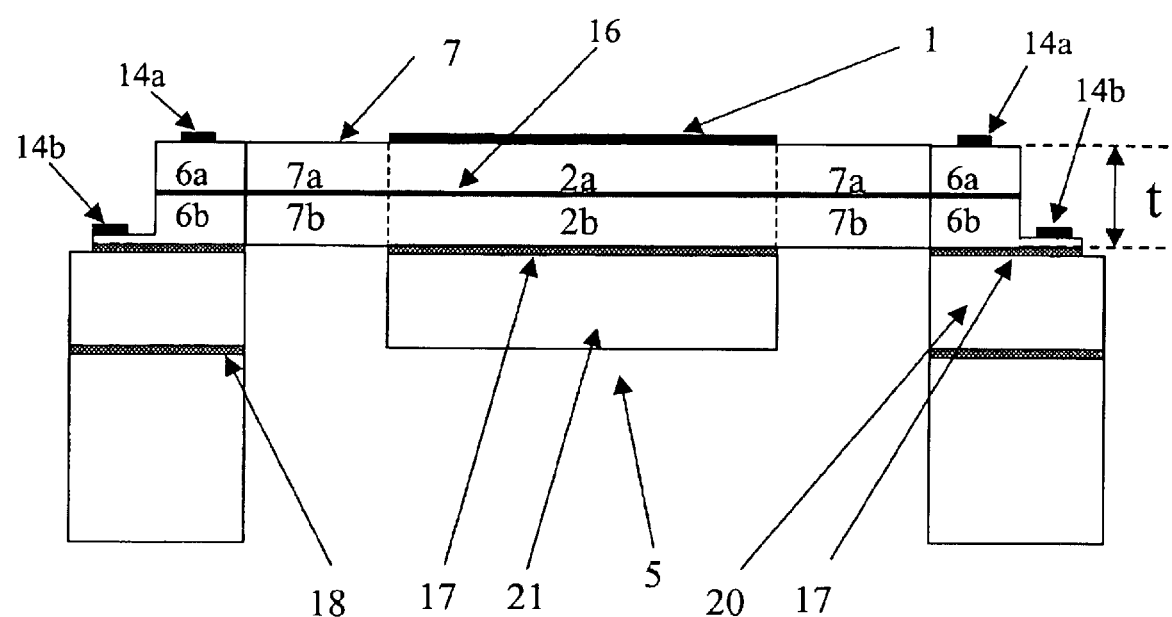

The rotating element 2 and mirror 1 may have various shapes such as rectangular, square, round, and octagonal. The rotating element 2 is usually made thick enough to keep the mirror 1 flat despite the stress present in the thin film forming the mirror 1 itself. FIG. 2D shows a method to increase the thickness of the support below the mirror 1 without impacting the thickness uniformity of the flexures 7 and stationary electrodes 8 across the wafer. In this method, a second mirror support 21 is provided and the insulating layer 18 acts as an etch stop for the second mirror support 21 whereas the insulating layer 17 acts as an etch stop for the flexure 7 and stationary electrode 8 during the etch of the cavity 5. Other ways could be used to obtain a thick and uniform mirror support. For example, a heavily doped p-type silicon layer can be used as an etch stop during a silicon etch with a wet etchant such as KOH. In addition, appropriate masking with timed etching can be used as long as the etch technique has acceptable uniformity across the wafer.

Figure 2E:
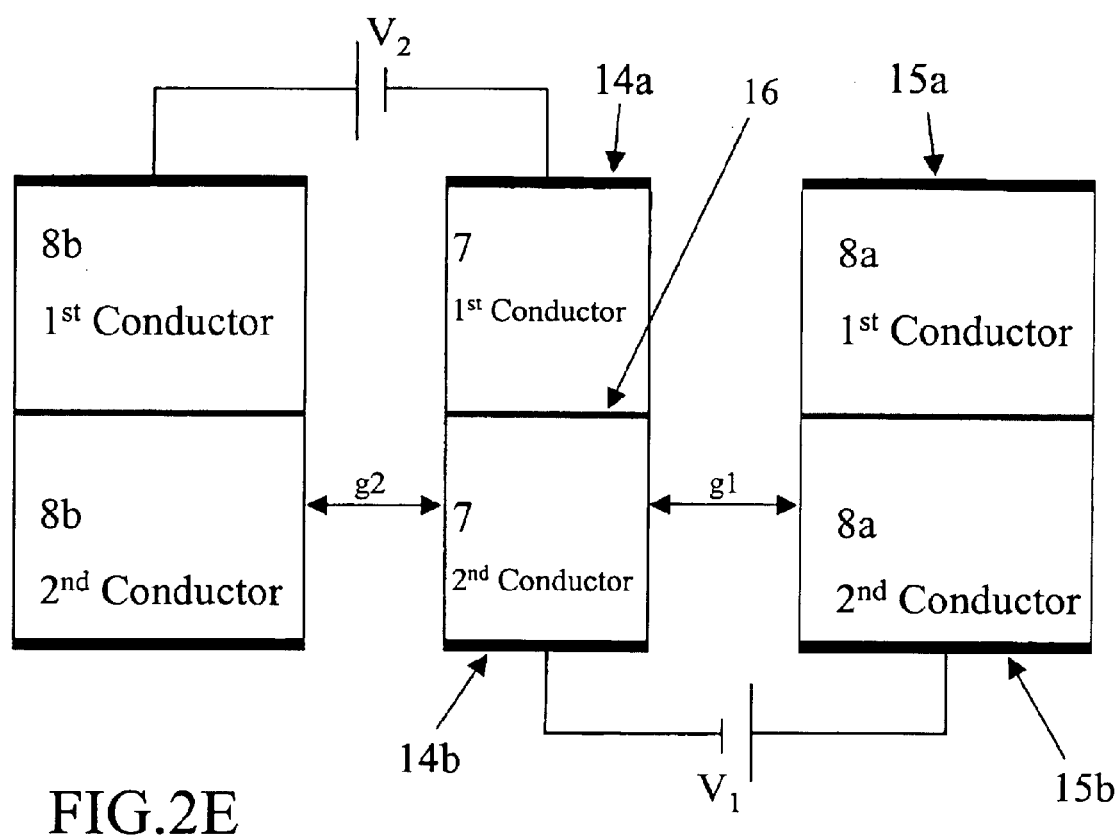

FIG. 2E shows a cross section of FIG. 2B along line B. One mode of operation of the vertical electrostatic actuator 33 is shown in FIG. 2E. In this mode, a bias voltage $V_1$ is applied between the second conducting layers of the mobile 7 and stationary 8a electrodes and a bias voltage $V_2$ is applied between the first conducting layers of the mobile 7 and stationary 8b electrodes. This establishes electric fields between the second conducting layers of the mobile 7 and stationary 8a electrodes and between the first conducting layers of the mobile 7 and stationary 8b electrodes. Thus, the second conducting layer of the mobile electrode 7 is attracted toward the second conducting layer of the stationary electrode 8a and the first conducting layer of the mobile electrode 7 is attracted toward the first conducting layer of the stationary electrode 8b causing the rotating element 2 to rotate about axis A (coming out of the page). This is one mode of operation and other modes can be used. The resonant motion of the actuator may be excited by the application of a periodic potential near or at the resonant frequency of the actuator.

Figure 1A:
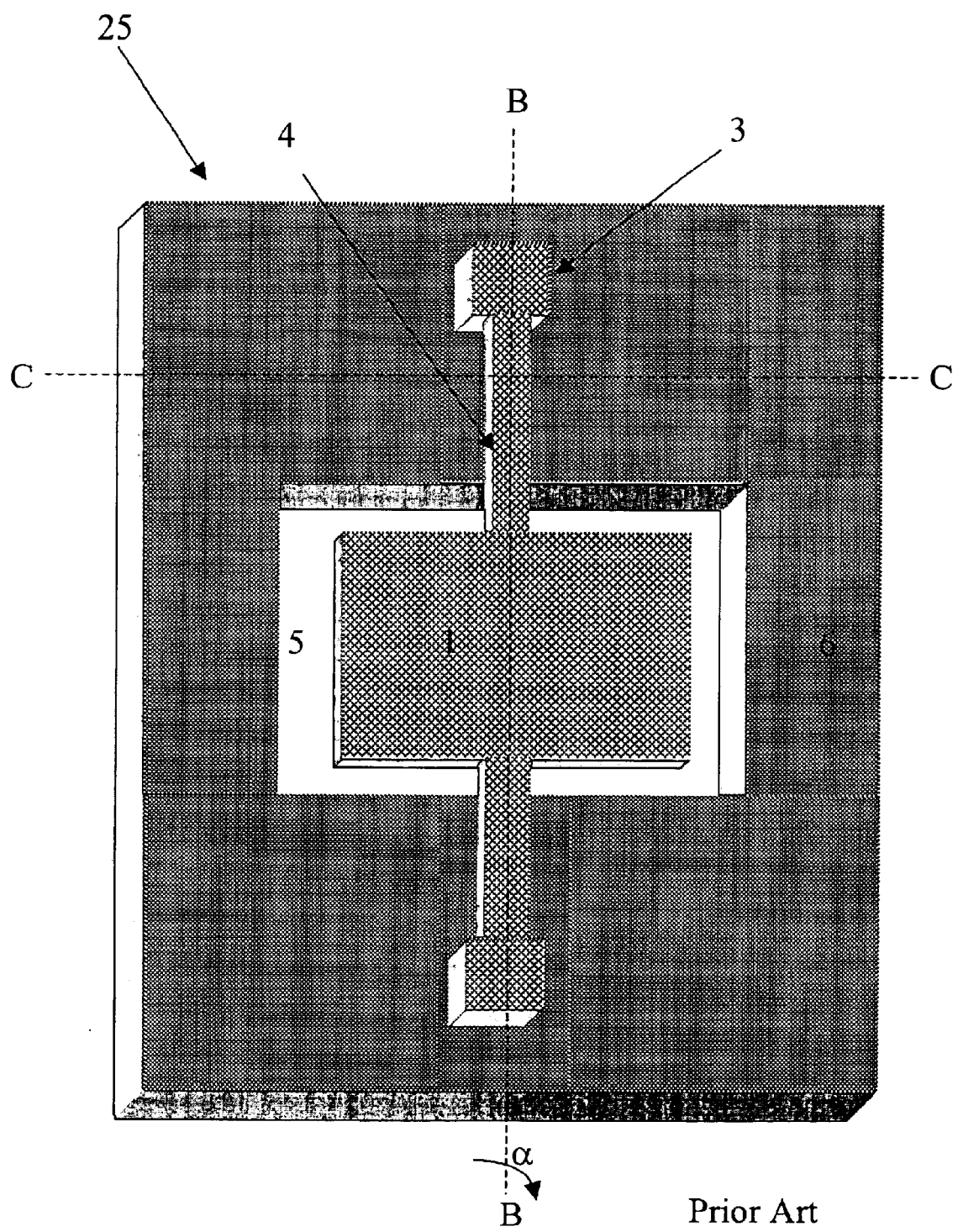
FIGS. 1A–1C show diagrams of a prior art electrostatic actuator.
Figure 1B:
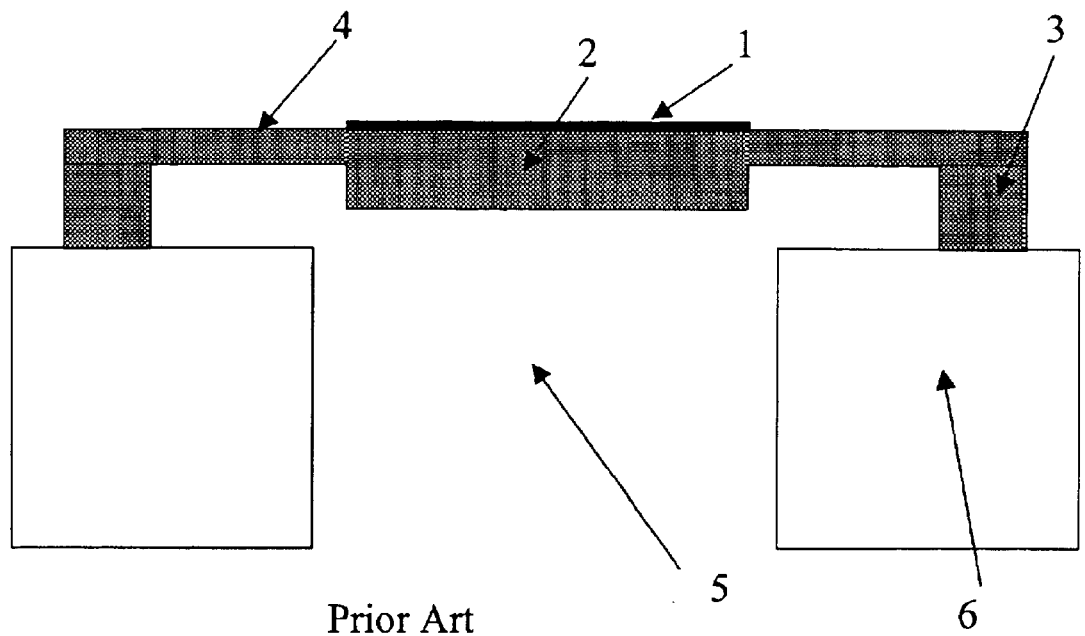
Figure 1C:
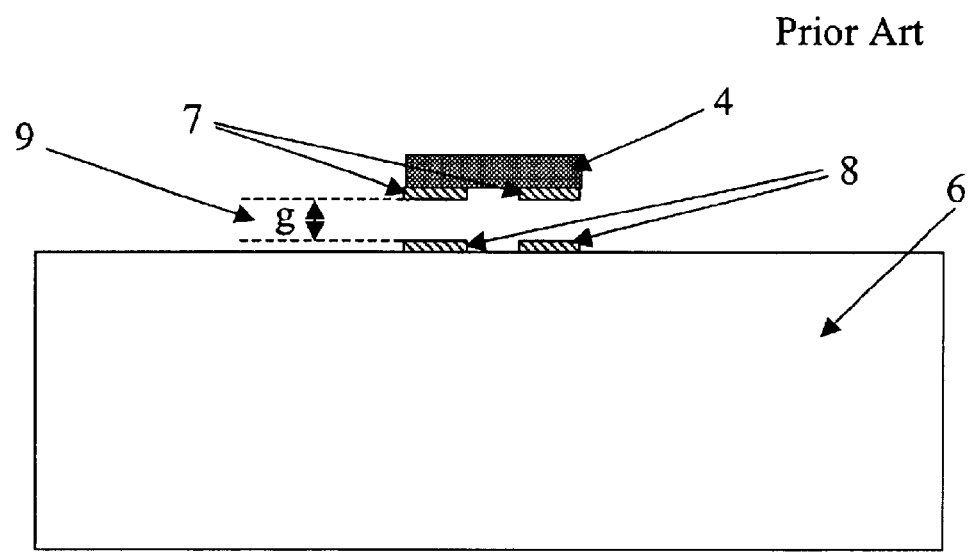

The vertical electrostatic actuator of FIGS. 2A–2E has at least three key advantages over known electrostatic actuators, such as the one shown in FIGS. 1A–1C. First, the torque exerted on the flexures 7 can be increased through the use of two stationary electrodes 8a and 8b for each flexure 7. This in turn can improve one or more of the following performance parameters: increasing the mirror's angle of rotation, increasing the switching speed, reducing the actuation voltage, and reducing the size of the electrostatic actuator. Reducing the actuator size, can lead to a switch with smaller size, which in turn leads to a switch array with smaller size. As the switch array size is reduced, the angle of rotation required to cover the whole array is also reduced.

Second, the actuators with two stationary electrodes 8 per flexure 7 have larger capacitance values, which translates to improved accuracy in capacitance measurements through potentially less complicated measurement schemes. This leads to more precise position sensors, which can be employed to precisely control the mirror's 1 angle of rotation $\propto$ through a feedback system.

Third, simpler fabrication methods may be used to produce actuators embodying the present invention. For example, assuming that the conducting layers a and b are made of doped silicon, the actuator and mirror can be realized in a single silicon Reactive Ion Etch (RIE) step as long as the insulating layer 16 is not thick. Otherwise, a dedicated RIE step can be used to quickly remove the thick insulating layer 16 prior to etching conducting layer b.

Figure 3A:
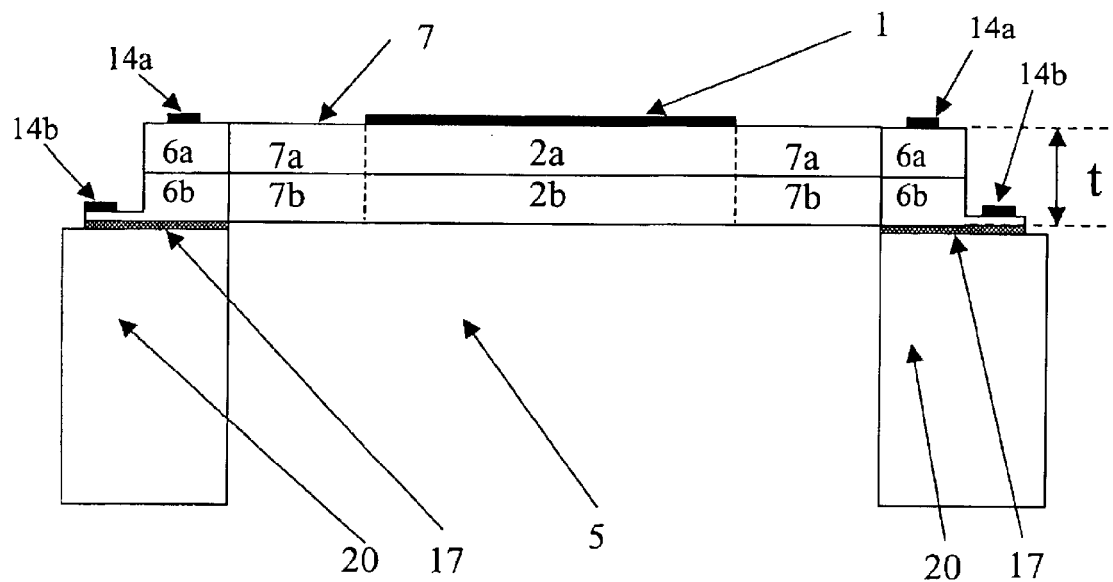
FIGS. 3A–3B show cross-sectional views of a pn-based torsional micro-mirror system in accordance with another embodiment of the invention.
Figure 3B:
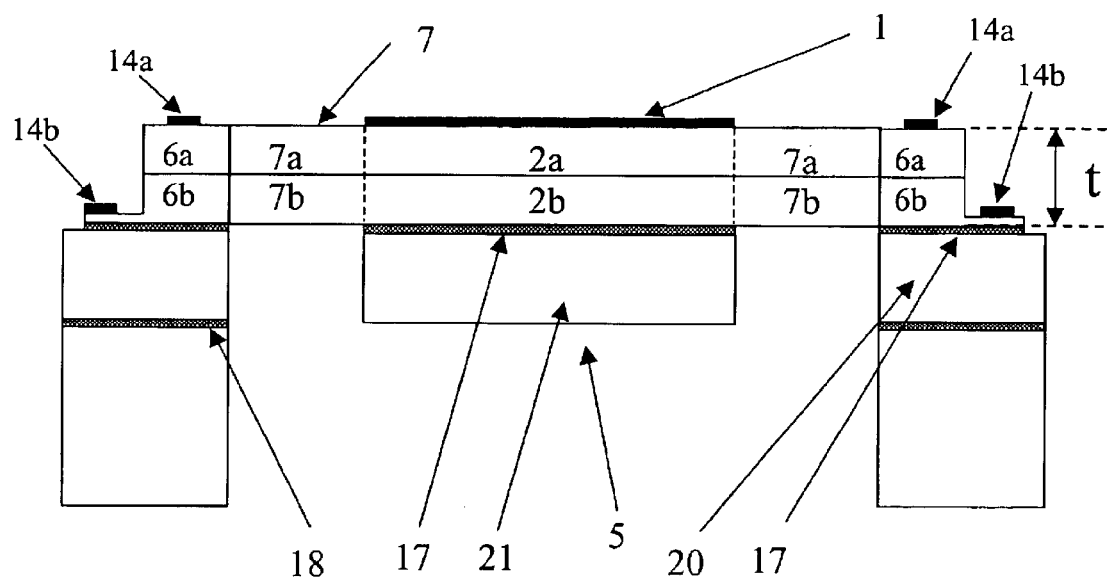

In an alternative embodiment of, the two conducting layers a and b of the electrodes 7 and 8a–b of the micromirror system 25 of FIGS. 2A–2D are replaced by a pn structure as shown in FIGS. 3A–3B. The pn structure consists of a p-type layer a on top of a n-type layer b or vice versa. The insulating layers 17 and 18 can be formed using any insulating material such as silicon oxide, silicon nitride, reverse biased pn-junction or an insulating air gap. The remainder of the elements shown in FIGS. 3A–3B correspond to those previously described in connection with FIGS. 2C–2D.

Figure 4:
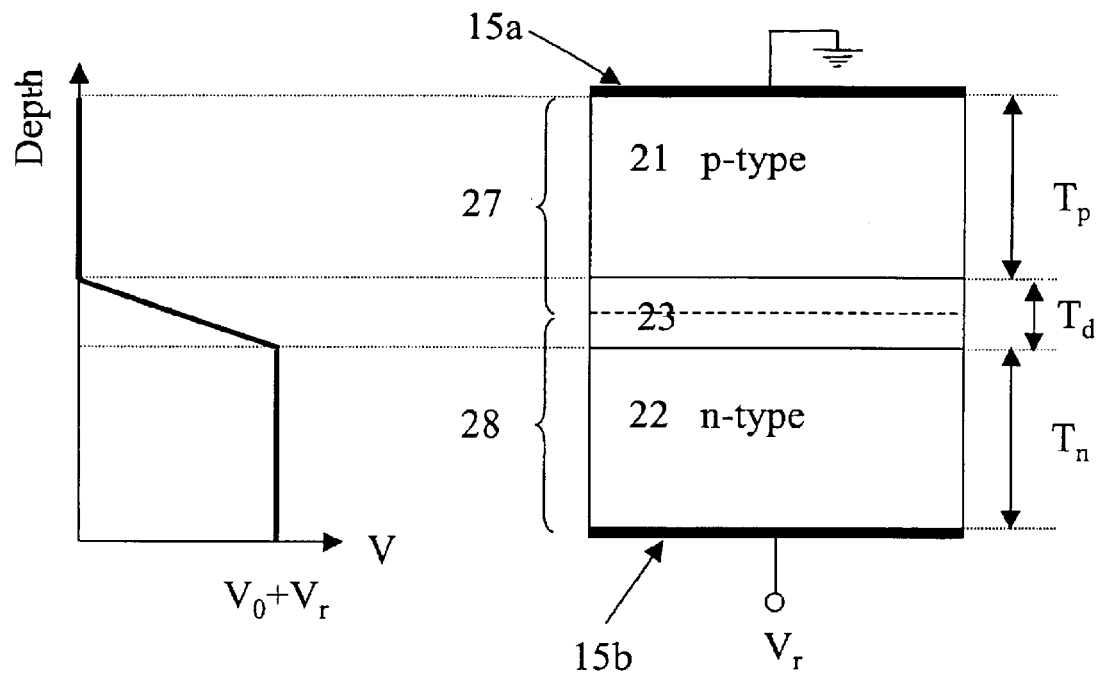
FIG. 4 shows a reverse biased pn-structure with the corresponding voltage profile across its depth.

As shown in FIG. 4, when a p-type semiconducting layer 27 and n-type semiconducting layer 28 come into contact, a depletion region 23 forms on both sides of the pn junction. This region is depleted of free carriers compared to the bulk p-type region 21 and n-type region 22 on both sides of the junction. The example shown assumes that the edges of the depletion regions are sharply defined, and this is a good approximation in some cases. An internal built-in potential $V_o$ forms across the depletion region 23. When an external reverse bias voltage $V_r$ larger than zero is applied across the pn-structure through the metal contacts 15 as shown in FIG. 4, the voltage across the depletion region 23 becomes $V_o+V_r$. This voltage starts from zero at the border of the p-type region 21 and increases until it reaches $V_o+V_r$ at the border of the n-type region 22. Although the graph of FIG. 4 illustrates a linear voltage over the depletion region, it is frequently the case that the voltage exhibits non-linear characteristics over the depletion region 23. The voltage across the p-type region 21 is uniform and equal to zero whereas the voltage profile is uniform and equal to $V_o+V_r$ across the n-type region 22. As the reverse bias voltage $V_r$ increases, the depth $T_d$ of the depletion region 23 increases whereas both the depth $T_p$ of the p-type region 21 as well as the depth $T_n$ of the n-type region 22 decrease. By reducing the dopant concentration of the n-type region 22, the depletion region 23 can be extended to cover the entire depth of n-type region 22 thus leading to an increasing voltage profile across the bottom layer of the pn-structure.

When a positive external voltage $V_f$ is applied to the p-type region 21 and n-type region 22 is grounded, the pn-structure becomes forward biased and the voltage across the depletion region 23 becomes $V_o - V_f$ and the depth of the depletion region 23 decreases. The current across the pn-structure is very high (milliamps range) when the structure is forward biased and depends on $V_f$, whereas the current is very low (microamp range or lower) when the structure is reverse biased and is independent of $V_r$ as long as $V_r$ is lower than the breakdown voltage of the pn-junction.

Figure 5A:
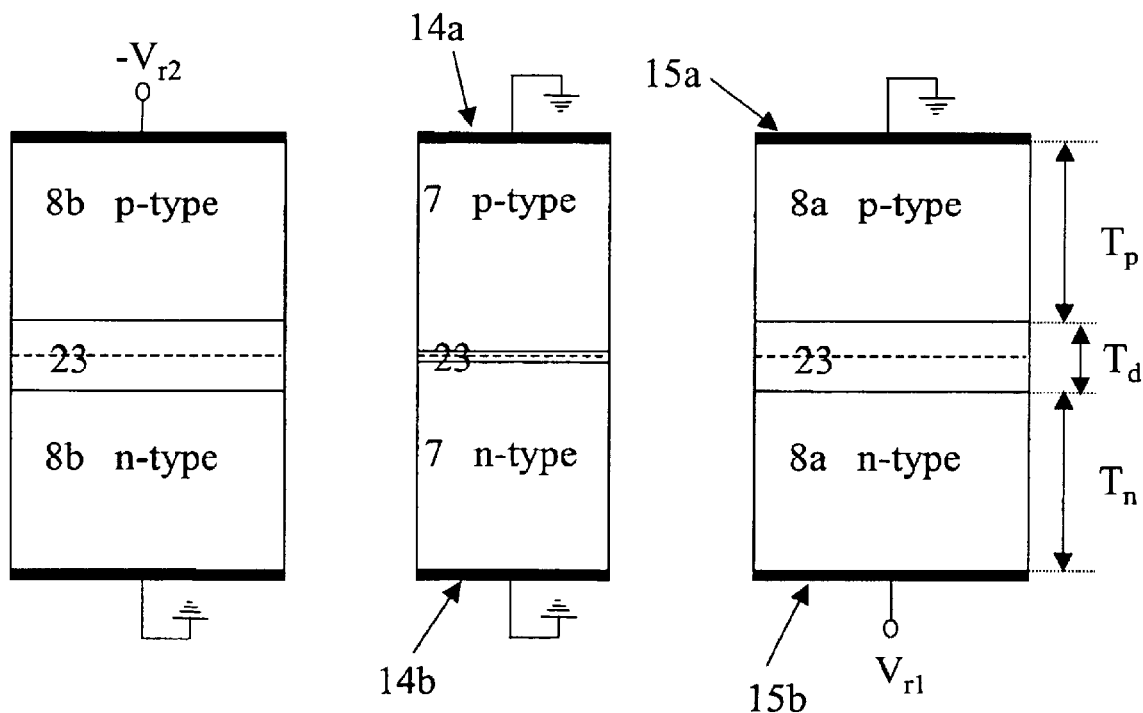
FIGS. 5A–5B show cross-sectional views of two pn-based vertical electrostatic actuators under operation, in accordance with an embodiment of the invention.

When the pn-diode across the stationary electrode 8a is reverse biased as shown in FIG. 5A and the n-type region of the mobile electrode 7 is grounded, an electric field is established between the n-type region of the mobile electrode 7 on one side and both the depletion region 23 and the n-type region of the stationary electrode 8a on the other side. Thus, the n-type region of the mobile electrode 7 is attracted toward the n-type region of the stationary electrode 8a causing the rotating element 2 to rotate about axis A (coming out of the page). Additional torque can be exerted on the p-type region of mobile electrode 7 by reverse biasing the pn-diode across the stationary electrode 8b and grounding the p-type region of the mobile electrode 7 as shown in FIG. 5A. This leads to attracting the p-type region of the mobile electrode 7 toward the p-type region of the stationary electrode 8b. This mode of operation is given as an example to explain the operation of the actuator and other modes of operation can be used. The resonant motion of the actuator may be excited by the application of a periodic potential to the electrodes near or at the resonant frequency of the actuator.

Figure 5B:
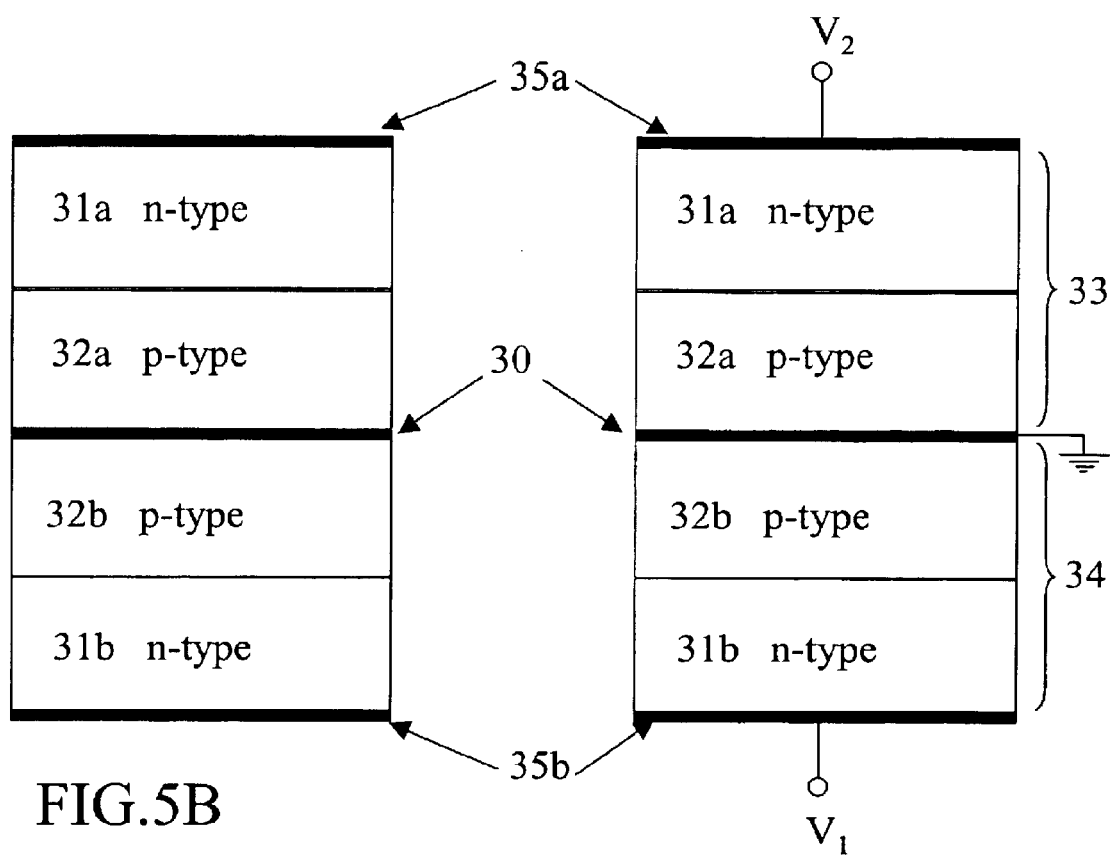

In another embodiment, the pn-based vertical comb-drive actuator has 2 pn-structures connected back to back as shown in FIG. 5B. The center layer 30 separating the top pn-structure 33 and the bottom pn-structure 34 is conducting and can be, for example, a heavily doped semiconductor layer or a metal layer. By controlling both pn-structures independently through the application of two reverse bias voltages V1 and V2, the rotating element can be rotated in or out of its plane in a push-pull configuration. If V1 is applied across the bottom pn-diode 34 of a first electrode through pad 35b and the n-type region 31b of a second electrode is grounded through pad 35b while V2=0, the second electrode will rotate toward the bottom n-type region 31b of a first electrode. On the other hand, if V2 is applied across the top pn-diode 33 of a first electrode through pad 35a and the n-type region 31a of a second electrode is grounded through pad 35a while V1=0, the second electrode will rotate toward the top n-type region 31a of a first electrode. This push-pull function can be achieved using a single stationary electrode. Other variations to this mode of operation are possible.

The actuator layer arrangement is not limited to the forgoing conductor or pn-structures and may consist of an intrinsic semiconducting layer sandwiched between a p-type semiconducting layer and a n-type semiconducting layer (PIN-structure) or a metal-oxide-semiconductor (MOS) structure. It also may consist of a graded pn-structure or multiple stacks of pn- and/or pin-structures or any other combinations. The p-type layer 21 and n-type layer 22 in the stationary electrode 8 may have different depths and different layer arrangements from these ones in the mobile electrode 7.

Some of the advantages of a pn-based vertical electrostatic actuator over a conductor-type vertical electrostatic actuator, such as that of FIGS. 2A–E are as follows. First, a pn-based vertical comb-drive actuator provides a non-uniform voltage profile across the actuator depth compared to a uniform voltage profile across the depth of vertical electrostatic actuator of FIG. 2. The operational effects of this non-uniform voltage profile become more pronounced as the depth of a comb-drive actuator becomes comparable to the depletion region depth. The application of a pn-based vertical comb-drive actuator directly on the flexures allows having actuators with small depths, thus, permitting the use of the non-uniform voltage profile to its full extent. Second, a pn-based vertical electrostatic actuator allows altering the voltage profile across the actuator depth by altering the reverse bias voltage applied across the pn-structure. As the reverse bias voltage increases across first electrode, the n-type region 22 depth $T_n$ decreases and the depletion layer 23 depth $T_d$ increases. Third, simpler fabrication methods may be used due to the absence of the insulating layer 16 of FIGS. 2C–2D. In this case, the actuator and mirror can be realized in a single silicon Reactive Ion Etch (RIE) step.

Figure 6A:
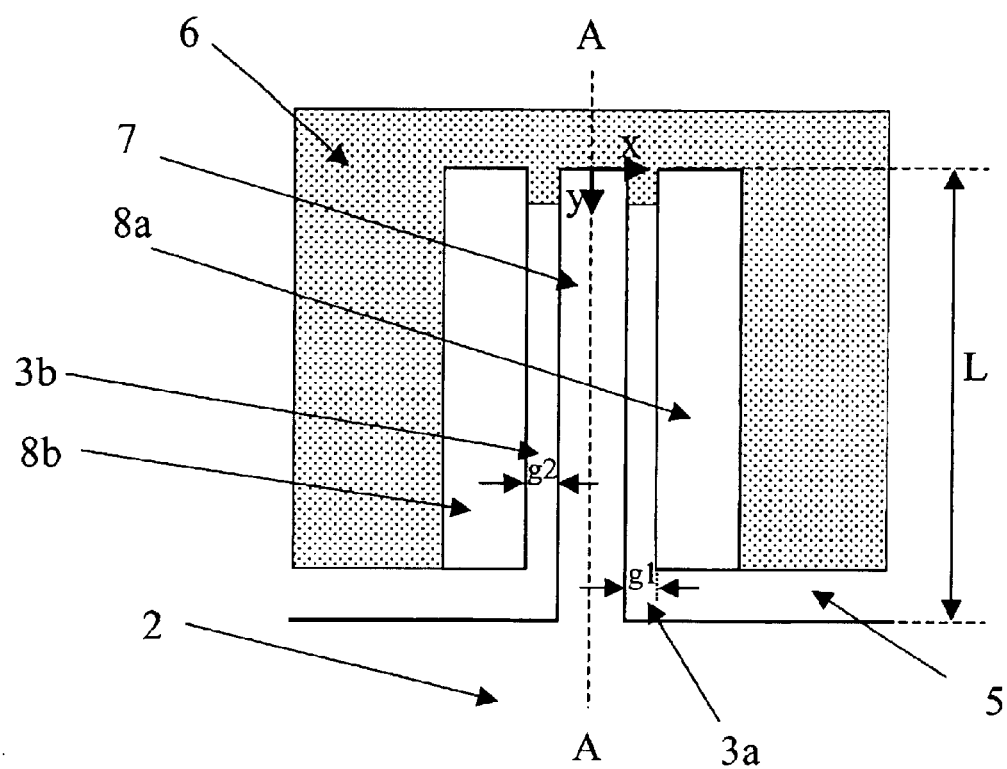
FIGS. 6A–6D shows plan views of several flexure designs usable with the micro-mirror systems described herein.

FIGS. 6A–6D show various flexure 7 and gaps 3a and 3b configurations. FIG. 6A shows uniform gaps 3a and 3b with $g_1$ and $g_2$ sizes and a flexure 7 with uniform width along its length. Stationary electrodes 8a and 8b apply electrostatic force on the a flexure 7 causing it with a mirror support 2 to rotate within a cavity 5 about a centerline A.

Figure 6B:
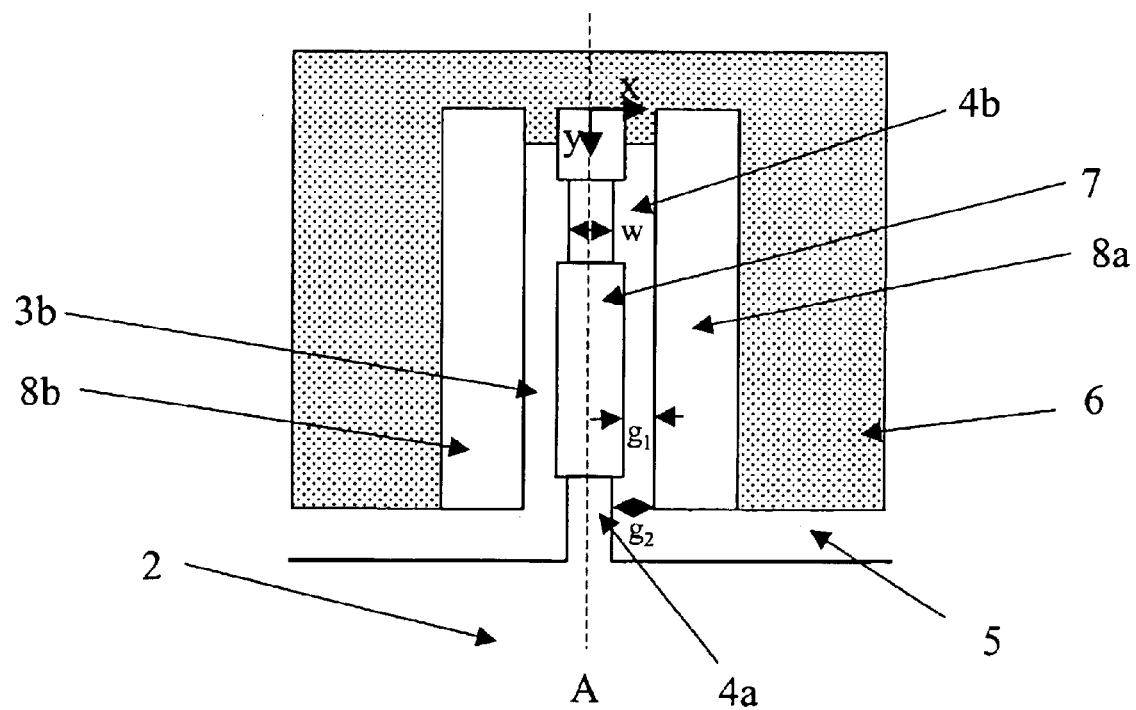
Figure 6C:
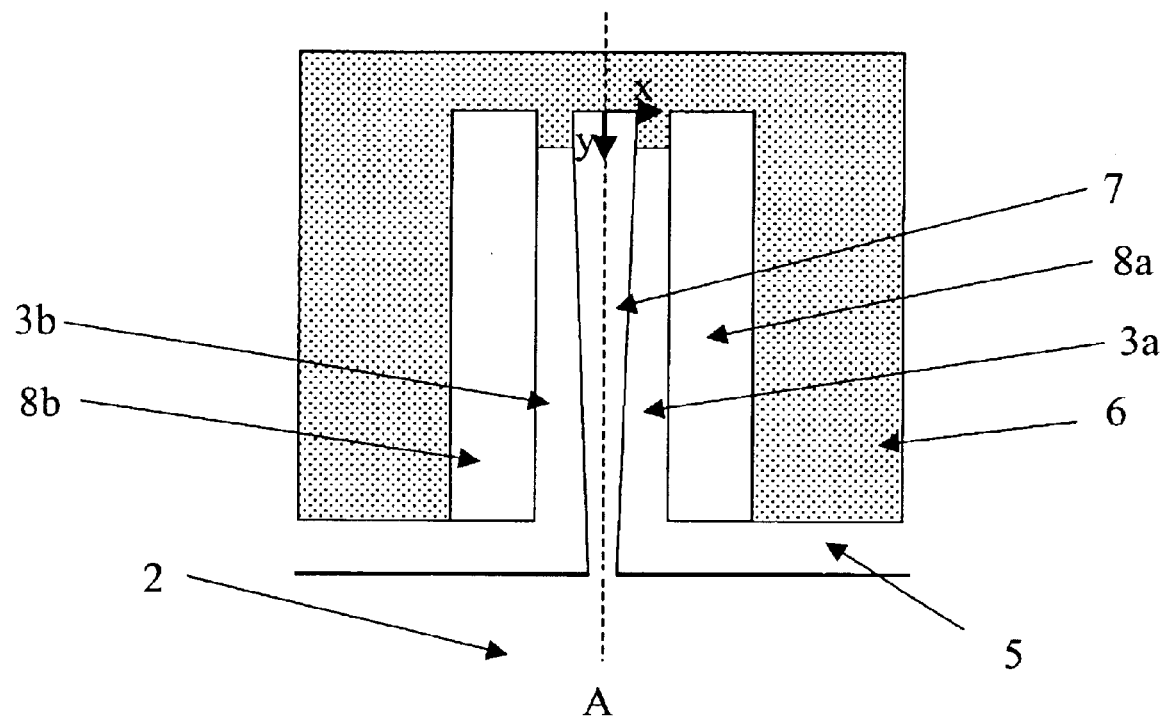
Figure 6D:
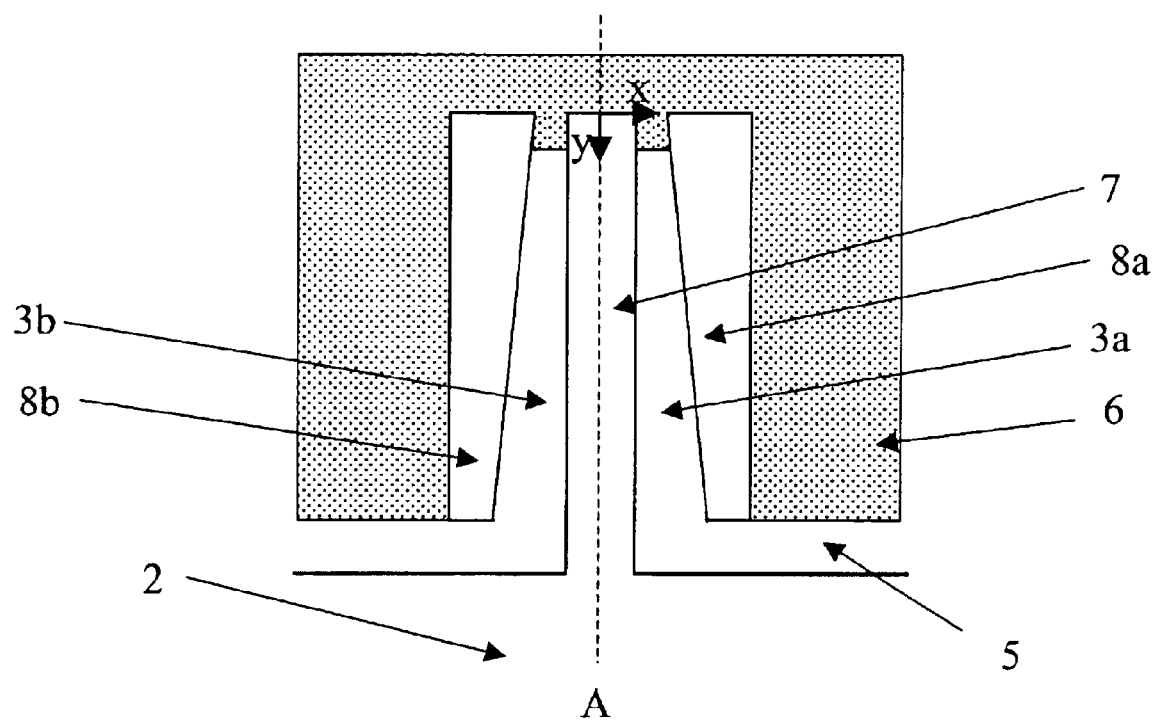

The actuators of FIGS. 6B–6D take advantage of the fact that the angle of rotation varies along the flexure 7 length y, starting from approximately zero at the base 6 (i.e. y=0) and ending at a maximum angle of rotation $\alpha_1$ at the mirror support 2 (i.e. y=L). Assuming that $g_1 \leq g_2$ (FIG. 6A), the maximum angle of rotation $\alpha_1$ is given by $\sin(\alpha_1) = 2g_1/d$, where $g_1$ is the gap size and d is the flexure depth. In addition, assuming that the variation is linear along the flexure length, the angle of rotation $\alpha$ as a function of y is given by $\alpha(y) = \alpha_1 - (\alpha_1/L).(y-L)$. FIG. 6B shows a flexure 7 with two necked down regions 4a and 4b. These necked down regions 4a and 4b reduce the stiffness of the flexure and allow a higher angle of rotation. The presence of region 4a (FIG. 6B) allows the flexure 7 to rotate to a larger angle prior to touching the stationary electrode 8a and 8b in comparison with a uniform flexure that has no necked down region.

FIG. 6C shows a tapered flexure 7 where the flexure width has a maximum at the base 6 and decreases with the flexure length until it reaches a minimum width at the mirror support 2. The flexure 7 width and the gap 3a and 3b are both impacted in this case leading to a specific flexure stiffness and larger angle of rotation.

In FIG. 6D, the stationary electrodes 8a and 8b are tapered leading to a non-uniform gap with a uniform flexure 7. This design separates the flexure stiffness design from the gap design and still leading to a larger angle of rotation.

Figure 7A:
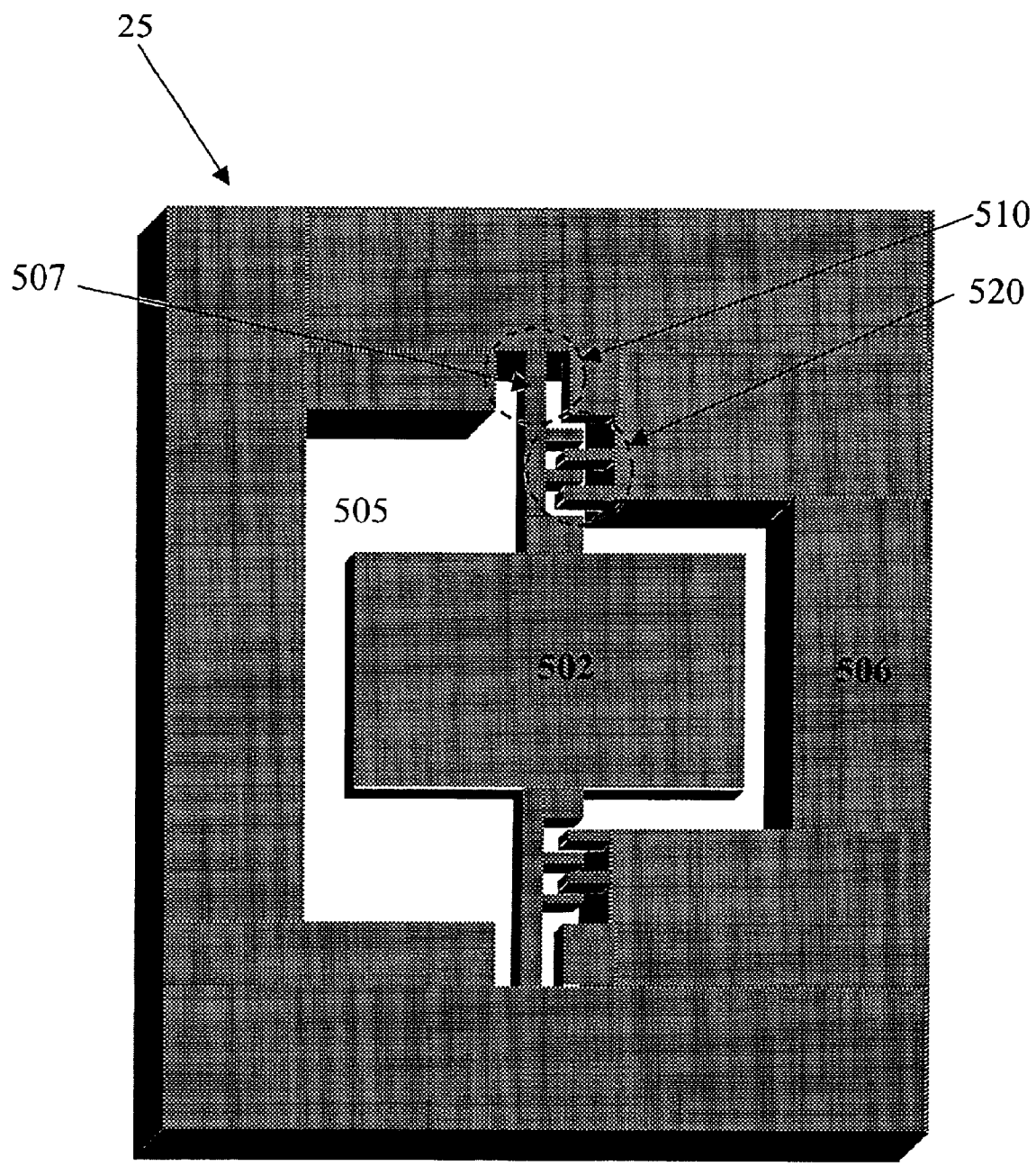
FIGS. 7A–7B show simplified plan views of micro-mirror systems employing both vertical electrostatic actuators and comb-drive actuators acting on the flexures and the torsion element, respectively, in accordance with an embodiment of the invention.
Figure 7B:
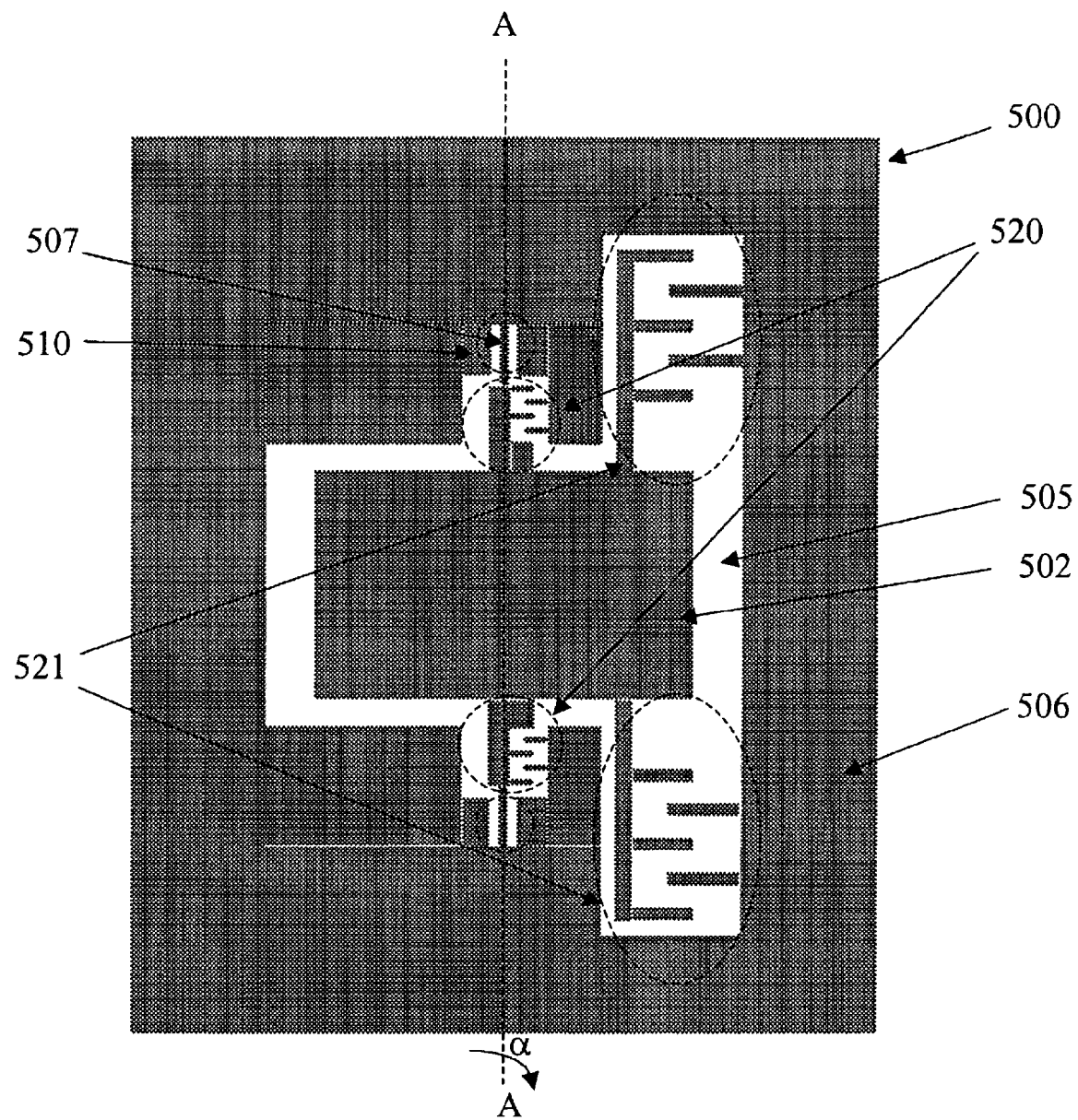

FIGS. 7A–7B show various embodiments of micro-mirror systems that incorporate a combination of vertical electrostatic actuators 510, such as those disclosed herein and vertical comb-drive actuators 520, 521, such as those disclosed in U.S. application Ser. No. 10/315,366, and those disclosed in international patent publications WO 01/73934 A2, WO 01/73935 A2, WO 01/73936 A2, WO 01/73937 A2, WO 01/74707 A2 and WO 01/76055 A2 to Behin et al.

Vertical electrostatic actuators 510 can be used to provide an initial overlap between the top conductor of the mobile comb fingers and the bottom conductor of the stationary comb fingers of the vertical comb drive actuators 520 and 521. Thus, eliminating the need for an additional bias force applied to the rotating element 502 to generate an initial overlap between mobile and stationary comb fingers. In addition, this arrangement permits the application of a larger force, thus, reducing the applied voltage and/or increasing the angle of rotation α. On the other hand, vertical electrostatic actuators 510 have non-linear actuation characteristics (i.e. non-linear variation of the angle of rotation with the applied voltage). Using both types of actuators simultaneously may result in actuation characteristics with smaller non-linearity, which is desirable. One may also drive and sense a return signal at the vertical electrostatic actuator 510, first comb-drive actuator 520, and/or second comb-drive actuator 521 in order to control the position of a rotating element 502, which rotates about flexures 507 axis A in a cavity 505 made in a base 506 below and around the rotating element 502, actuators 520 and 521 and flexures 507. In addition, various combinations of these actuators can be used for sense and drive signals. Uni-axial and multi-axial micro-mirror systems can be implemented based on this configuration.

Figure 8:
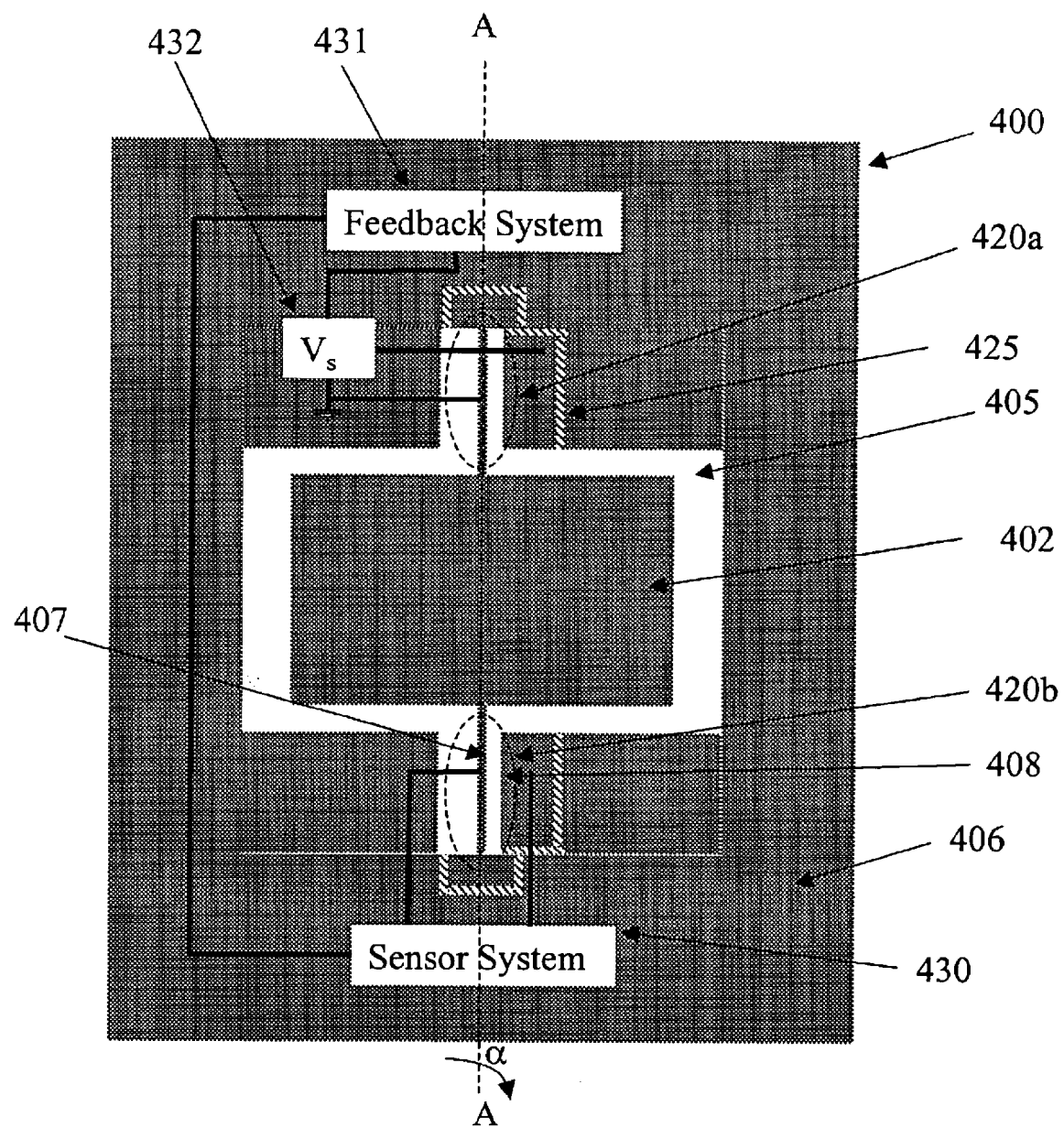
FIG. 8 shows a plan view of a micro-mirror system with an actuator and a position sensor in accordance with an embodiment of the invention.

FIG. 8 shows another embodiment in accordance with the present invention where vertical electrostatic actuators are employed as both rotating actuators and position sensors. In this embodiment, a micro-mirror system 400 may have a sensor system 430 that measures the capacitance between stationary 408 and mobile 407 electrodes of actuator 420b. Actuator 420 may be a vertical electrostatic actuator and/or a pn-based vertical electrostatic actuator of this disclosure, and can be a vertical comb-drive actuator, pn-based vertical comb-drive actuator, multi-gap actuator, variable-gap actuator or a combination of two or more of these actuators disclosed here or elsewhere including those disclosed in a (1) U.S. application Ser. No. 10/315,366, (2) U.S. Pat. No. 6,201,629B1 issued to R. W. McClelland et al., and (3) international patent publications WO 01/73934 A2, WO 01/73935 A2, WO 01/73936 A2, WO 01/73937 A2, WO 01/74707 A2 and WO 01/76055 A2 to Behin et al.

In a pn-based vertical electrostatic actuator, capacitance between stationary and mobile electrodes and/or depletion region 23 capacitance of a reverse biased pn-structure can be measured with a sensor system 430. The measured capacitance may then be fedback to a voltage source 432 through a software and/or hardware feedback system 431 to control the position of a rotating element 402, which rotates about flexures 407 axis A in a cavity 405 made in a base 406 below and around the rotating element 402 and flexures 407.

Mobile electrodes 407 are isolated from stationary electrodes 408 by an insulating layer 425 such as an air gap. Both mobile and stationary electrodes are isolated from an underlying substrate (not shown in the figure) by an insulating layer such as silicon oxide or a reverse biased pn-junction. In the above scheme, a voltage source 432 drives actuator 420a and a sensor system 430 senses a return signal at electrodes 407 and 408 of actuator 420b. It is possible to drive and sense a return signal at the electrodes of one or both actuators 420.

Alternative schemes may be used to sense the capacitance of comb fingers such as the use of an AC bias to drive one actuator 420a and sense a return signal at the other actuator 420b. Differential capacitance techniques can also be used to enhance performance and sensitivity of the sensor 430 and feedback 431 systems used to control the position of the rotating element 402. In differential capacitance techniques, two or more capacitances are measured and used to control a rotating element 402 position. Other types of position sensors such as capacitive sensors, magnetic sensors, electromagnetic sensors, optical sensors, piezoresistive sensors, piezoelectric sensors and a combination of two or more of these sensors may be used in a micro-mirror system.

One advantage of the position sensor of this disclosure is its relatively large capacitance in comparison to known sensors due to the small gap between the mobile and stationary electrodes. This in turn leads to improved accuracy in capacitance measurements through potentially less complicated measurement schemes.

Figure 9:
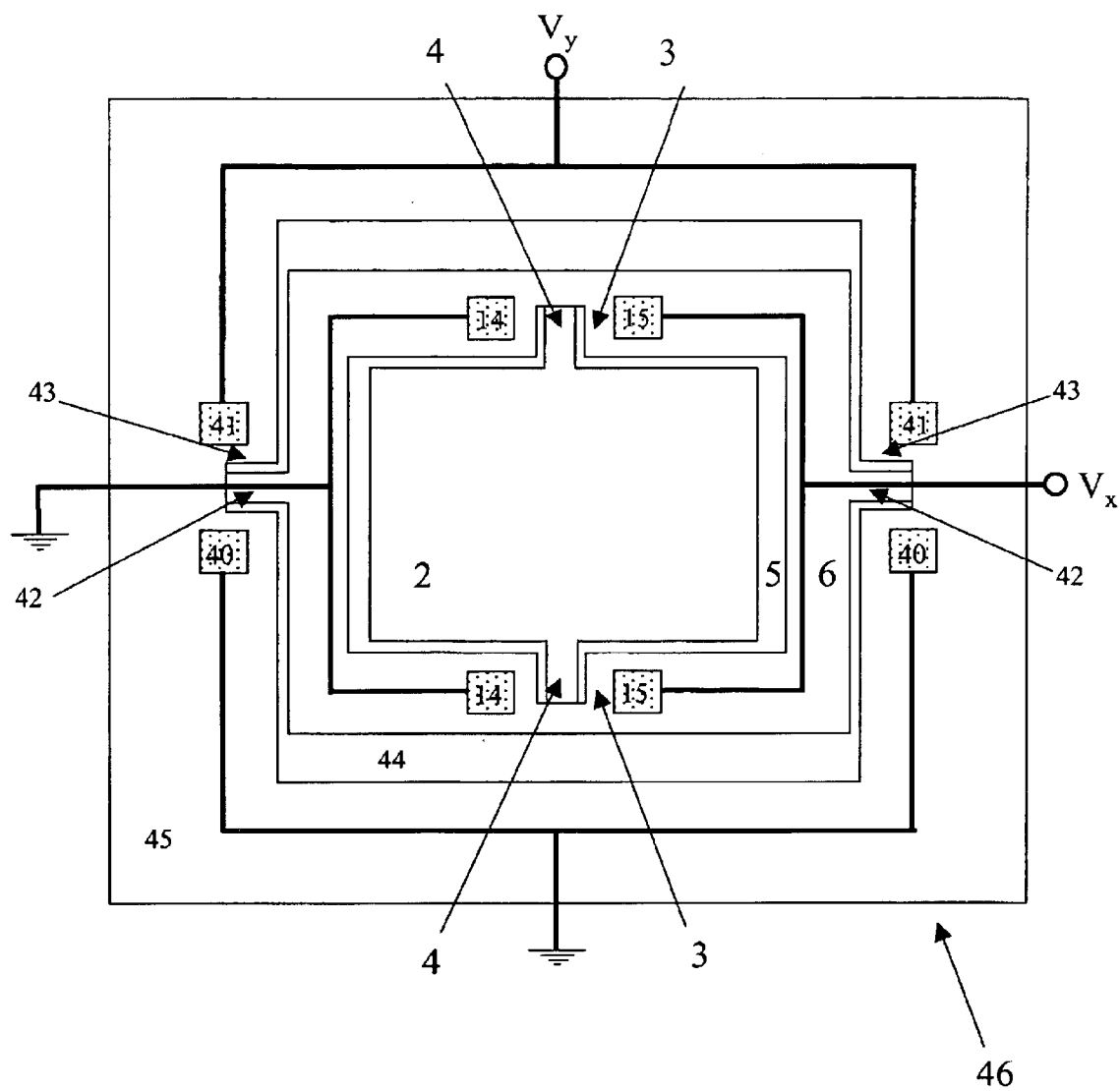
FIG. 9 shows a plan view of a multi-axial micro-mirror system.

A multi-axial micro-mirror system may be formed using designs and processes described herein. One possible multi-axial micro-mirror 46 design is shown in FIG. 9. A first pair of flexures 4 and electrodes 3 is used to rotate a rotating element 2 about one axis, and a second pair of flexures 42 and electrodes 43 is used to rotate a rotating element 2 and a base 6 about a second axis. In this case, the first and second axes may be perpendicular. The first pair of flexures 4 and electrodes 3 connects a rotating element 2 to a rotating support base 6. This support base 6 is connected to a base 45 by a second pair of flexures 42 and electrodes 43. Additional rotating support bases and flexures can be added and may provide, for example, mirror alignment. The bias voltage Vx is applied to the inner mobile 4 and stationary 3 electrodes through metal pads 14 and 15. The bias voltage Vy is applied to the outer mobile 42 and stationary 43 electrodes through metal pads 40 and 41.

Figure 10A:
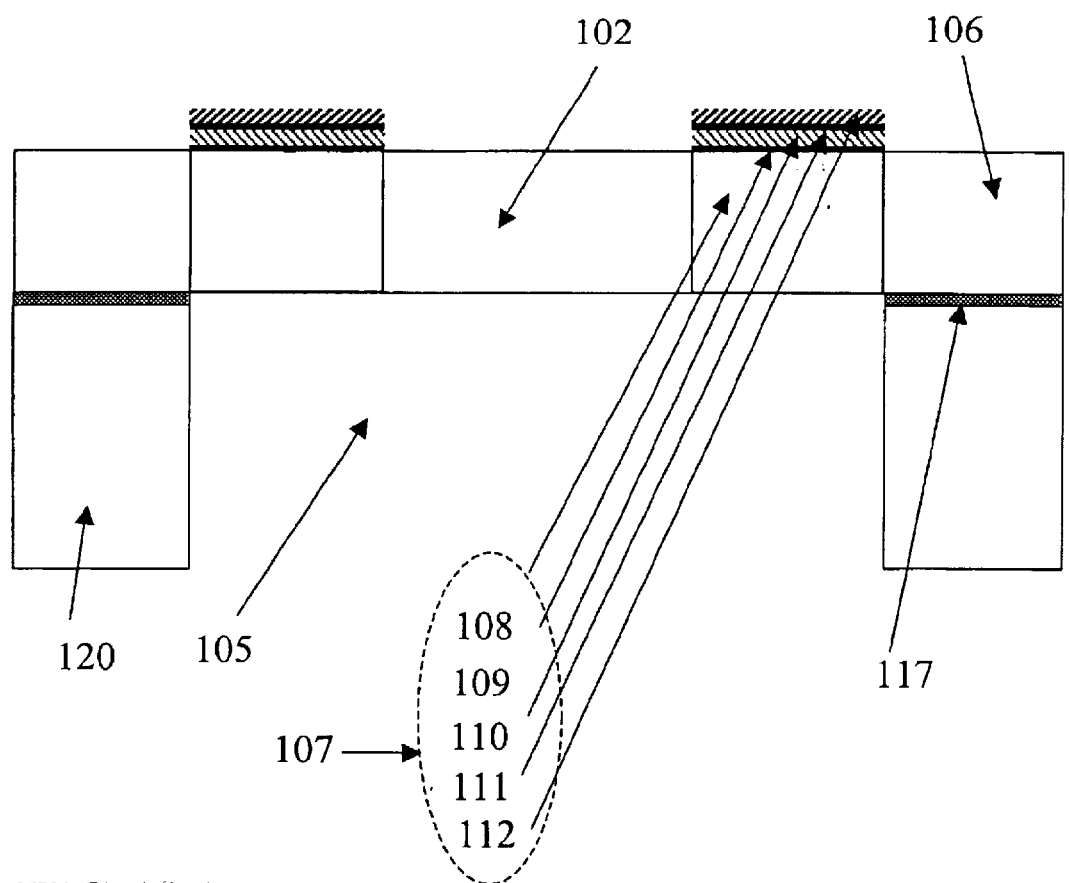
FIGS. 10A–10B show schematic views of a micro-mirror system where multi-layered flexures, serpentine springs and soft wires are used to create additional electrical paths.

If additional electrical paths are needed, for example, for the inner comb-drive actuators 3 and 4 of FIG. 9, they can be provided through multi-layered flexures 107 as shown in FIG. 10A. In this case, the flexure consists of a first layer 108, a first insulating layer 109, a first conducting layer 110, a second insulating layer 111, and a second conducting layer 112. A first layer 108 is connected to the base 106 and may be insulating, semiconducting or conducting layer. Insulating layers 109 and 111 can be silicon oxide, silicon nitride or any other insulating material. Conducting layers 110 and 112 can be highly doped silicon or metal such as Al or Au. The flexures 107 suspend a rotating element 102 over a cavity 105 formed in a base 106. An insulating layer 117 such as silicon oxide provides electrical isolation between the substrate 120 and the base 106. The impact of these insulating 109 and 111 and conducting 110 and 112 layers on the mechanical properties of the mirror system can be controlled.

Figure 10B:
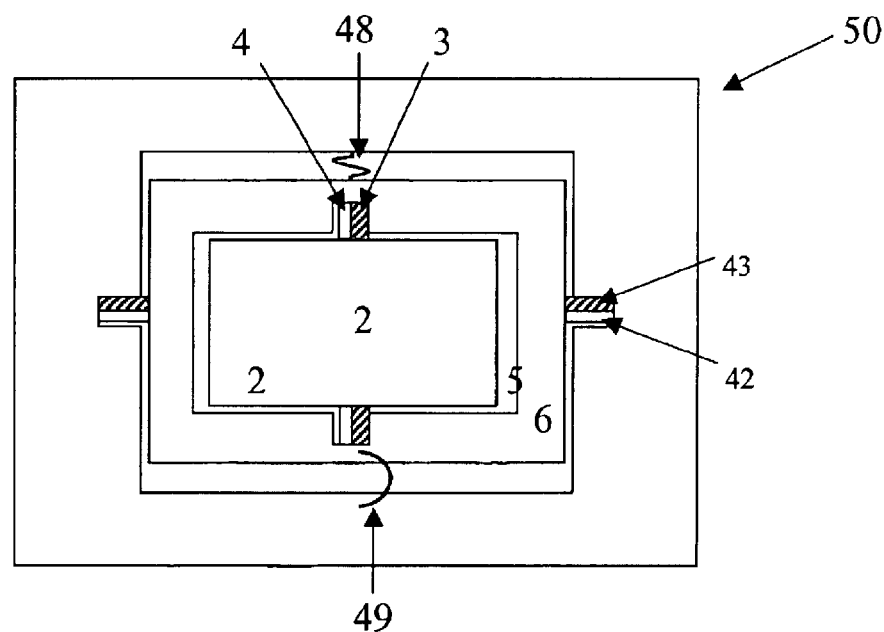

Alternatively, FIG. 10B shows the use of flexible serpentine springs 48 and soft wires 49, which may have minimal impact on the mechanical properties of the micro-mirror system 50, to provide additional electrical paths for the inner comb-drive actuators 3 and 4. Wire-bond techniques can be used to bridge the gap with soft wires 49 during packaging, whereas the serpentine springs 48 can be formed during the fabrication process of the micro-mirror system 50.

Figure 11A:
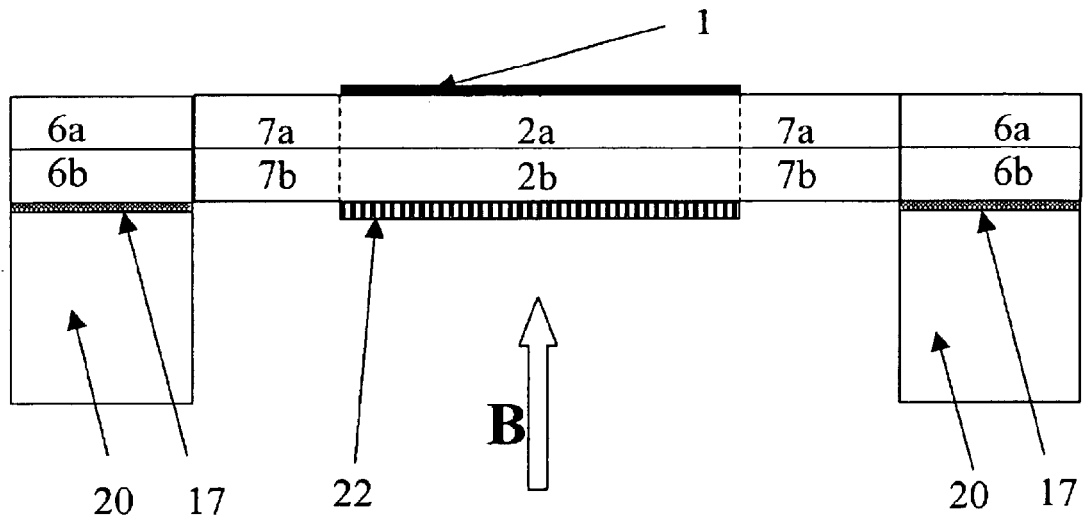
FIGS. 11A–11B show schematic cross-sectional views of a micro-mirror system wherein a magnetic bias force is used in conjunction with vertical actuators.
Figure 11B:
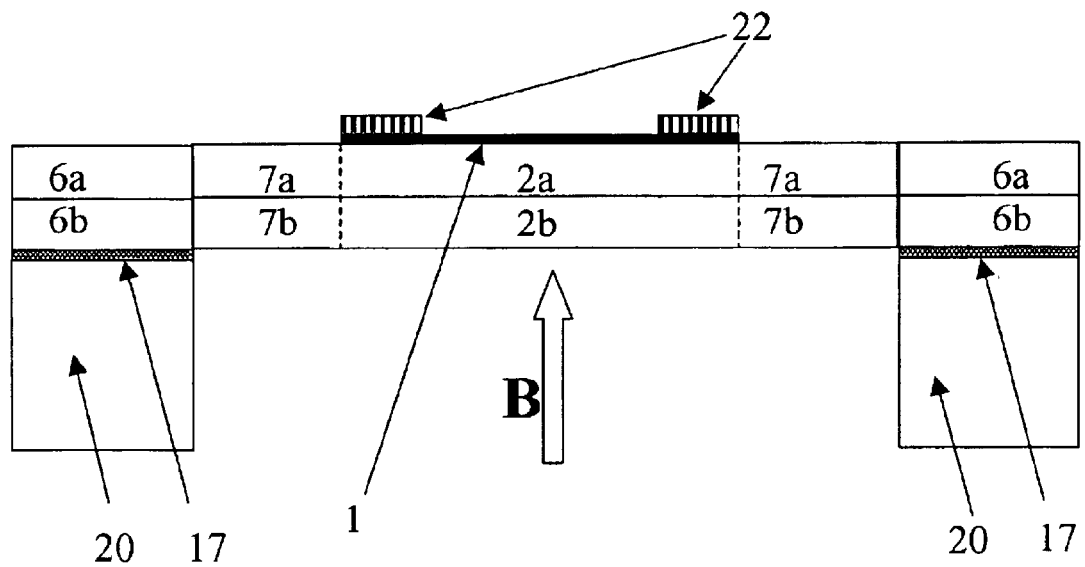

An alternative embodiment of a micro-mirror system is shown in FIGS. 11A–11B. This system uses a bias force in conjunction with vertical electrostatic actuators disclosed herein. A cross-sectional view of the micro-mirror system 25 of FIG. 2A taken along centerline A is shown in FIGS. 11A–11B. In this embodiment, a magnetic material 22 is applied to the bottom (FIG. 11A) and/or top (FIG. 11B) of a rotating element 2 totally or partially in order to give it a magnetic moment. The driving magnetic field B is given by an external magnet or electromagnet mounted below the rotating element 2 or at angle with it. A magnet may apply a fixed magnetic field, whereas, an electromagnet such as a current carrying coil may apply a varying magnetic field.

Therefore, external magnet or electromagnet applies a bias force to the rotating element 2 causing it along with the mobile electrode 7 (FIG. 2B) to rotate. The vertical electrostatic actuator is then used to apply force in the opposite direction to bring the rotating element 2 back to its initial position prior to the application of the bias force in a controlled fashion. It is possible to use the vertical electrostatic actuator solely as a position sensor and use the bias force to move the rotating element 2. The magnetic material can be patterned in order to optimize the mechanical and actuation performance of the torsional micro-mirror system 25.

There are numerous ways to establish a magnetic moment normal to the surface of the flexures 7 and/or rotating element 2. For example, flexures 7 of the micro-mirror system 25 may be made of a magnetic material and/or a magnetic material may be applied to them. Alternatively, a conduction coil can be fabricated on the surface of the rotating element 2, which provides a magnetic moment upon the application of a current. Also, a permanent magnet can be mounted on the rotating element 2 to provide a magnetic moment perpendicular to the surface of the rotating element 2.

In addition to magnetic actuators, bias force actuators include, but are not limited to, actuators based on films/materials with stress gradient across their thickness, actuators based on thermal bimorph materials, mechanical actuators such as spring loaded elements, piezoelectric actuators, comb-drive actuators, and capacitive actuators, such as a pair of gap-closing electrodes.

Figure 12:
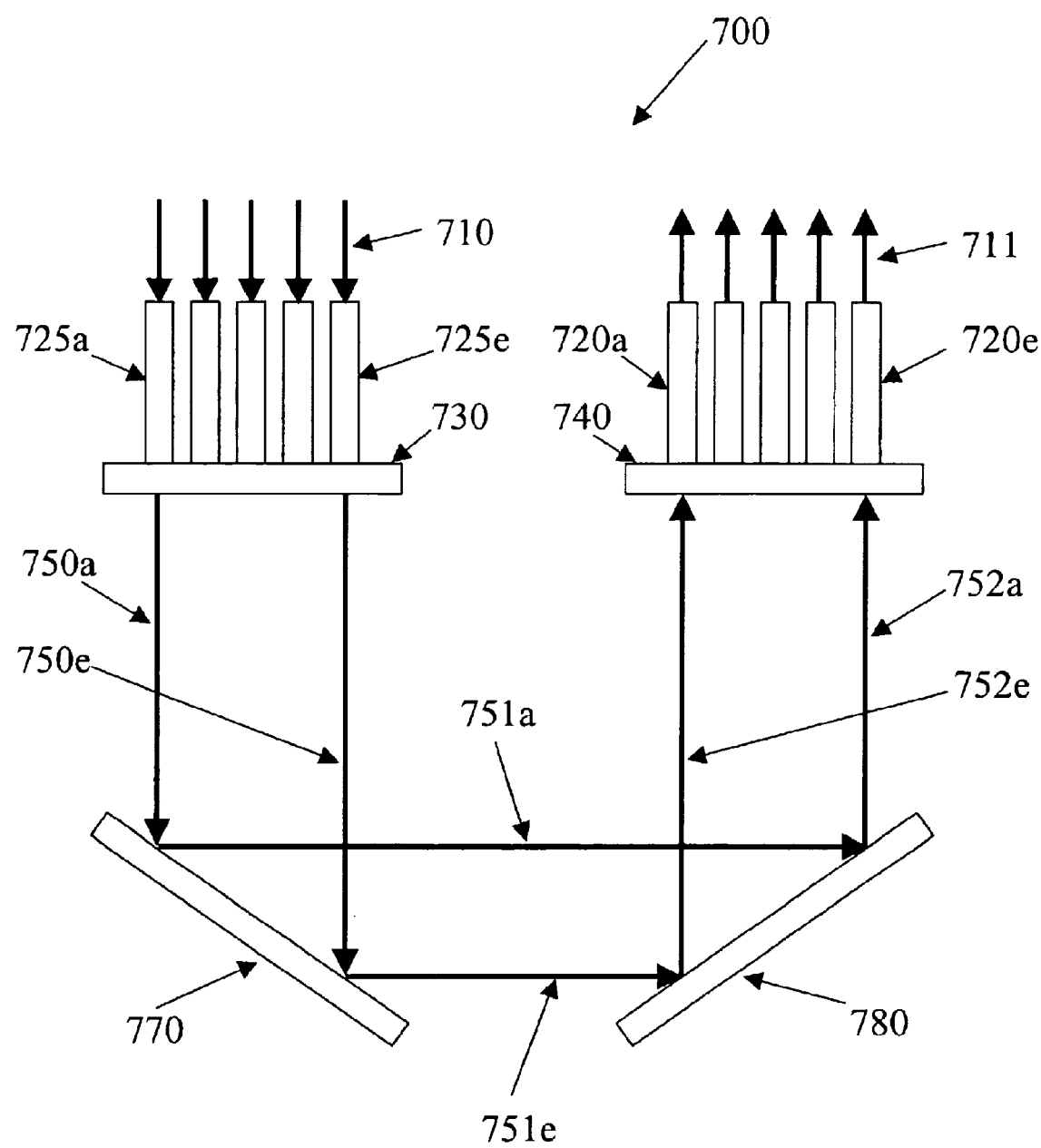
FIG. 12 shows a schematic view of an optical crossconnect incorporating a micro-mirror system of the present invention.

FIG. 12 shows an optical crossconnect 700 employing mirror arrays of uni-axial and bi-axial micro-mirror systems. Crossconnect 700 receives input optical signal 710 through an array of optic fibers 725, which is shown in FIG. 12 as a one-dimensional array with five fibers 725a, 725b, 725c, 725d, 725e. Input fiber array 725 is aligned with input lens array 730 so that each fiber of input fiber array 725 transmits corresponding optical signal of input optical signal 710 to a corresponding lens of input lens array 730 for collimation. Optical signal 750 collimated via input lens array 730 first strikes input mirror array 770 and is reflected onto output mirror array 780, which reflects optical signal 751 head-on to output lens array 740. Output mirror array 780 is positioned to receive optical signal 751 from the input mirror array 770. Optical signal 752 is coupled into output fiber array 720 via output lens array 740 and transmitted through output fiber array 720 to output optical signal 711. Input fiber array 725, input lens array 730, and input mirror array 770 are aligned and have equal array sizes. Thus, there is a one-to-one-to-one mapping of each input fiber to an input lens to an input mirror. This mapping allows coaxial alignment of the input and output optical signals with the fiber axes leading to low power loss. This is critical in single mode fibers due to the small numerical aperture. Similarly, output fiber array 720, output lens array 740, and output mirror array 780 are aligned and have equal array sizes with one-to-one-to-one mapping of each output fiber to an output lens to an output mirror. Input/output fiber, lens and mirror arrays are preferably two-dimensional N×N arrays. Each micro-mirror in input 770 and output 780 mirror arrays may tilt in an independent manner so that optical signals are steered on an individual basis.

Input 770 and output 780 mirror arrays may include uni-axial and bi-axial micro-mirror systems disclosed herein or combinations of both types. Any or all aspects of the systems disclosed herein, such as position sensing schemes, may be utilized in the crossconnect of FIG. 12 or in alternative configurations of optical crossconnects.

Fabrication methods are provided for the vertical electrostatic actuators, position sensors, and torsional micro-mirror systems described herein. Due to the structure of these actuators, their fabrication methods have significant advantages over fabrication methods of some known vertical electrostatic actuators. Actuators disclosed herein include pn-based vertical electrostatic actuators and vertical electrostatic actuators with one or more conducting and/or semi-conducting layers stacked on top of each other with an insulating layer such as silicon oxide between successive layers. In pn-based vertical electrostatic actuators, this insulating layer is eliminated leading to simplified the fabrication process of the actuator and allowing the use of silicon wafers or silicon-on-insulator (SOI) wafers that have only one insulating layer rather than two or more insulating layers.

A method of fabricating vertical electrostatic actuators is shown in FIGS. 13A–13E. Actuators disclosed herein can be made using various processes including, but not limited to, standard photolithography, plasma etch of thin films such as silicon oxide, reactive ion etch (RIE) and deep reactive ion etch (RIE) of silicon, and thin film growth and deposition, nano-technology techniques or any other suitable semiconductor fabrication process.

Figure 13A:
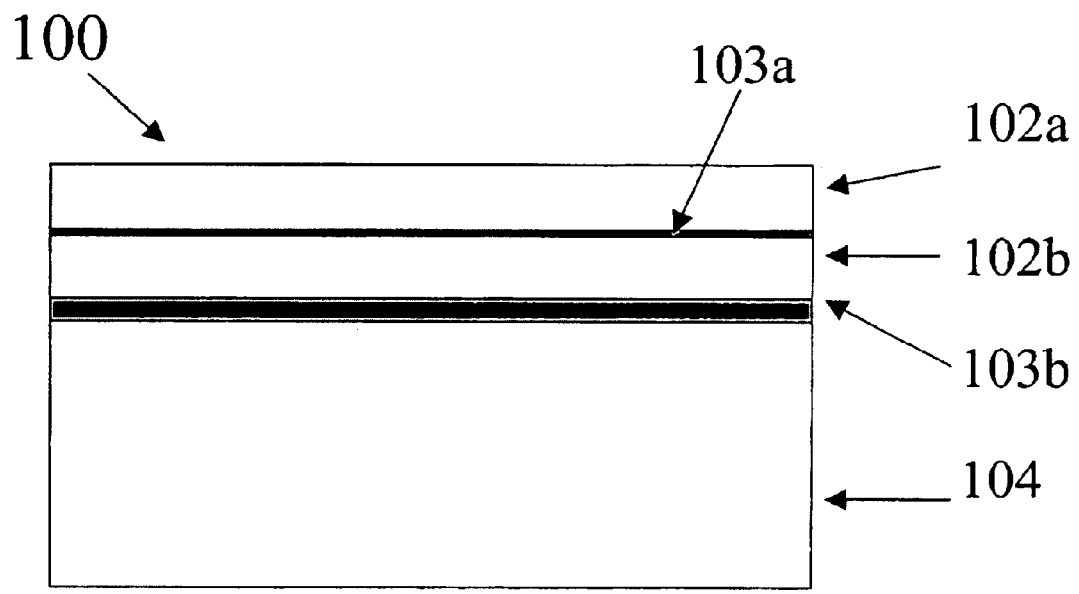
FIGS. 13A–13H show cross-sectional views of the fabrication process of vertical electrostatic actuators in accordance with an embodiment of the invention.

A cross-sectional view of a substrate along line B of FIG. 2B is shown in FIGS. 13A–13H. FIG. 13A shows a first 102a and a second 102b conducting and/or semiconducting layers, an insulating layer 103a and an optional second insulating layer 103b, and an optional substrate 104. Conducting and/or semiconducting layers 102a and 102b can be made of metals such as Al, Au and Ni, but can also be made of single-crystalline, poly-crystalline or amorphous semi-conducting materials such as Si, SiC, Ge, GaAs, InP, diamond and combinations thereof. Insulating layers 103a and 103b are preferably thermally grown silicon oxide but can be made of other insulating materials such as silicon nitride, un-doped diamond and reverse biased pn-junction. Substrate layer 104 can be silicon and can be, but not limited to, a combination of one or more of one of the following materials: Single-crystalline silicon, poly-crystalline silicon, amorphous silicon, single-crystalline silicon carbide, poly-crystalline silicon carbide, single-crystalline silicon germanium, poly-crystalline silicon germanium, single-crystalline diamond, poly-crystalline diamond, ceramic, metal (e.g., Au, Al, and Ni), silicon nitride, and silicon oxide.

Figure 13B:
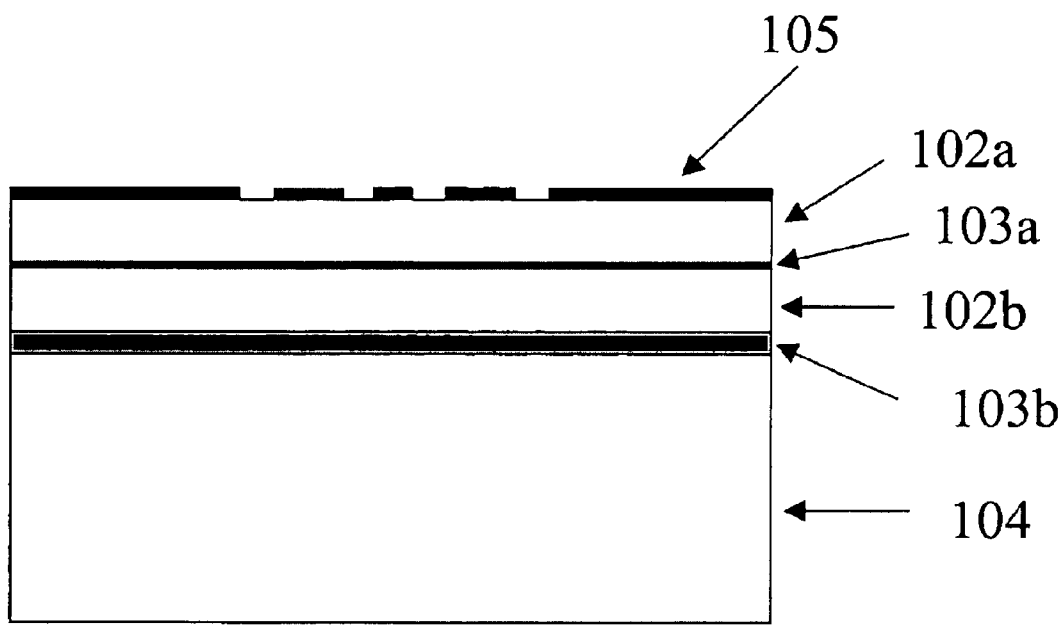
Figure 13C:
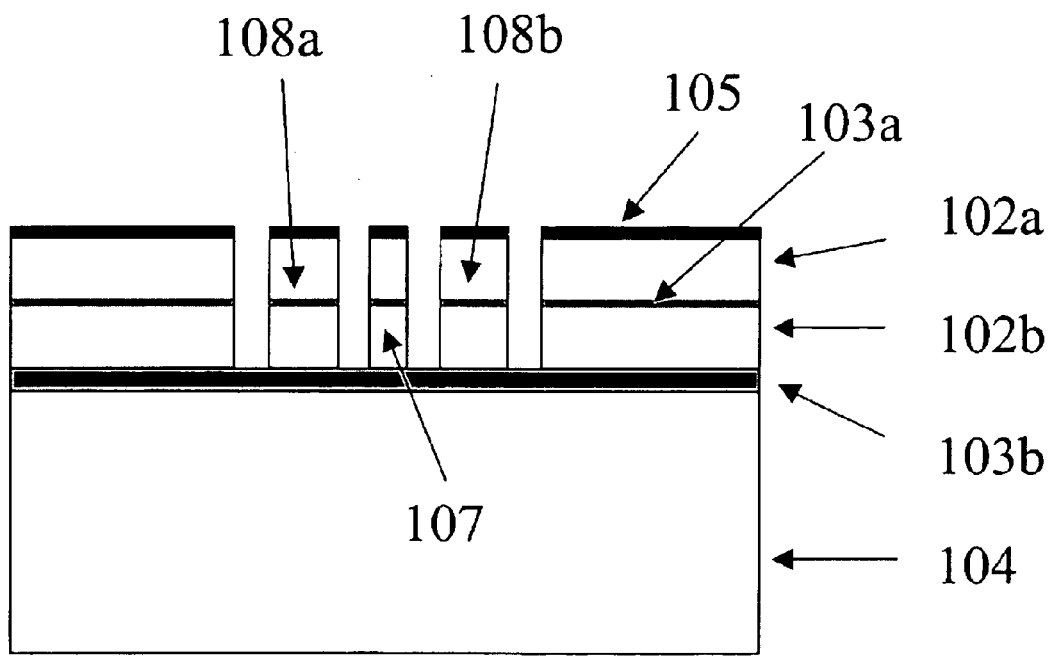
Figure 13D:
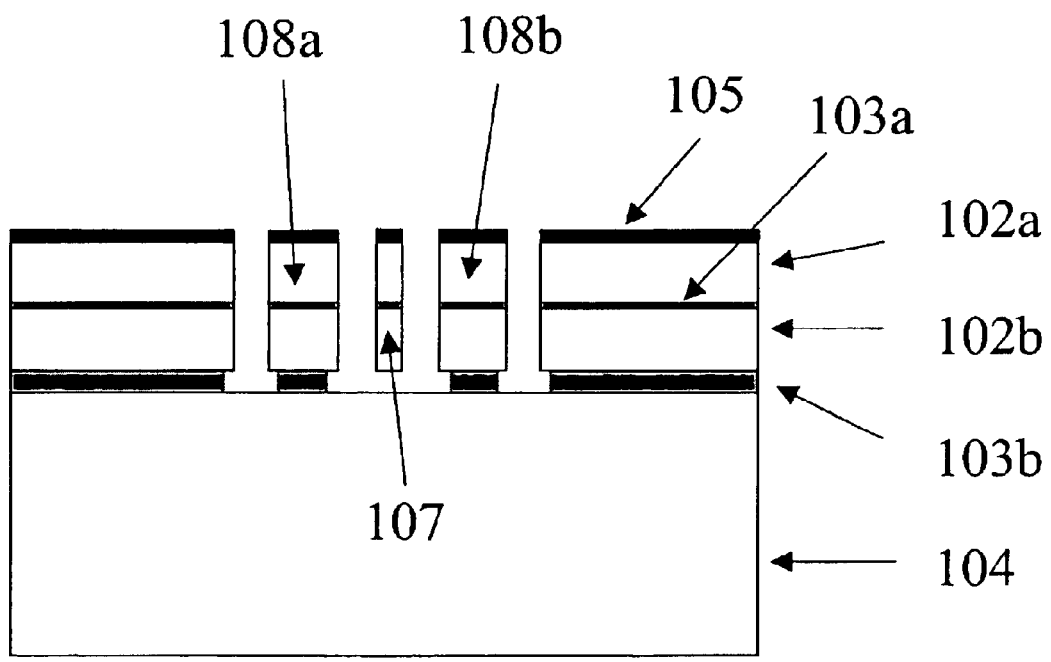
Figure 13E:
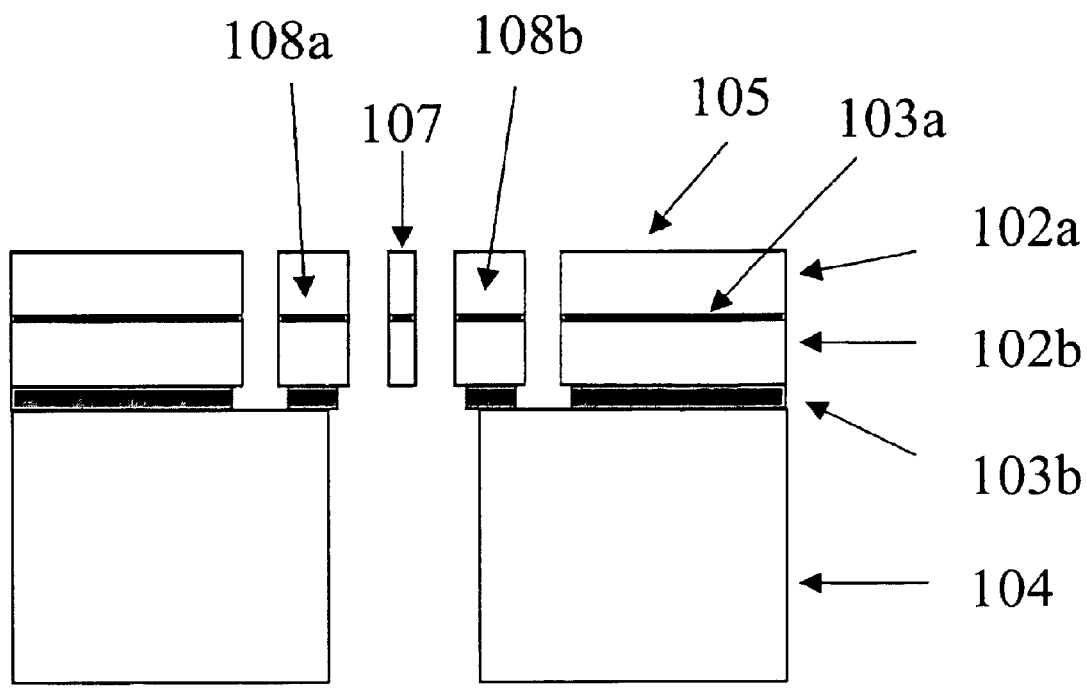

FIG. 13B shows a cross-sectional view of a patterned layer 105, which defines a vertical electrostatic actuator. This layer 105 is deposited on top of layer 102a and patterned as shown in FIG. 13B. This patterned layer acts as a masking layer during the process of etching layers 102a, 103a and 102b. This masking layer 105 can be silicon oxide, silicon nitride, photoresist or another suitable material. FIG. 13C shows a cross-sectional view of stationary electrodes 108a and 108b and a flexure that acts as a mobile electrode 107 after etching layers 102a, 103a and 102b in the areas that have no masking protection using, for example, Reactive Ion Etching (RIE). The insulating layer 103b is subsequently removed as shown in FIG. 13D using appropriate etch techniques such as Reactive Ion Etching (RIE) followed by a timed wet etching to release the mobile electrode 107 from the substrate 104. At this stage, the mobile electrode 107 is released from the substrate and can be tilted toward either stationary electrode 108a or stationary electrode 108b. A portion of the optional substrate layer 104 and the masking layer 105 are removed as shown in FIG. 13E.

Figure 13F:
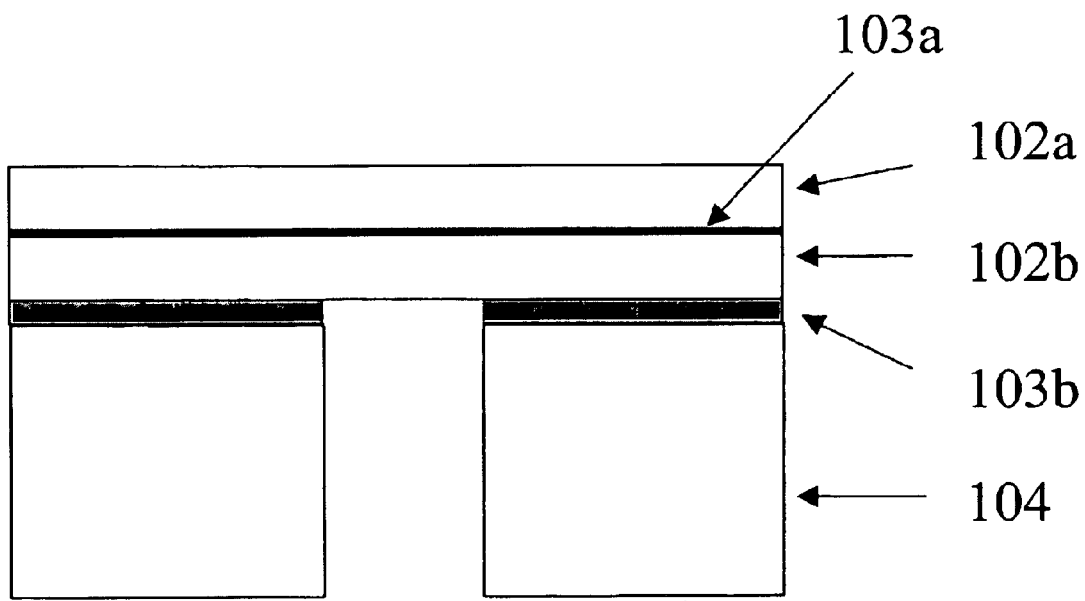
Figure 13G:
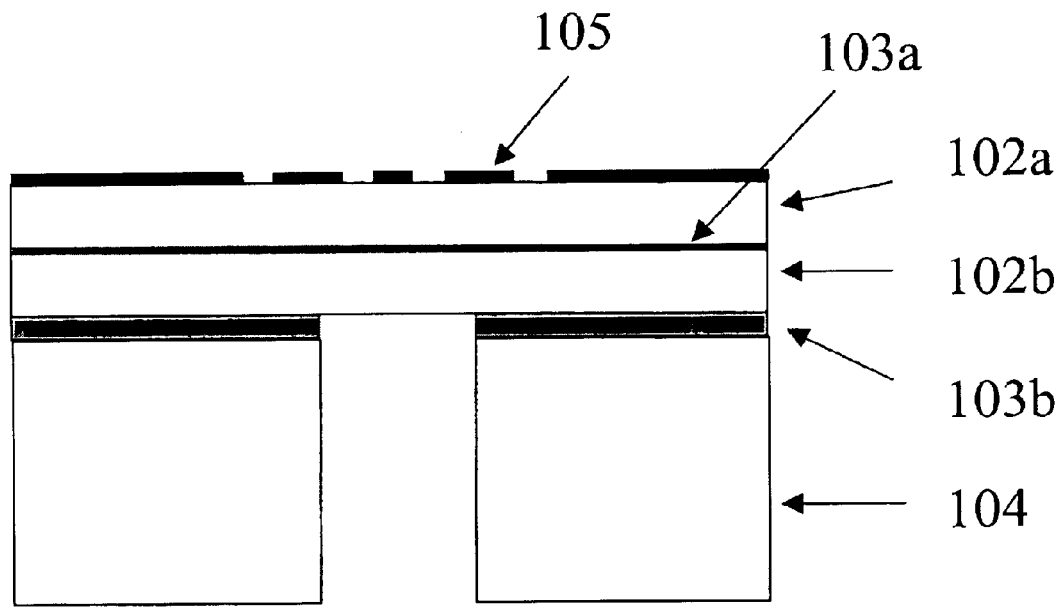
Figure 13H:
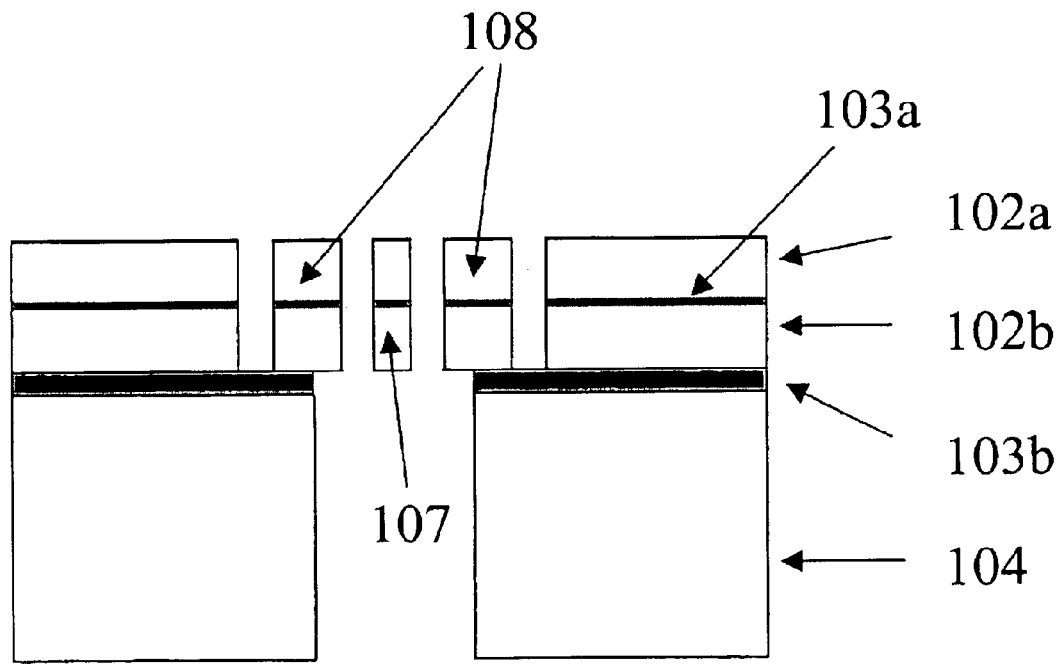

The order of the described fabrication steps can be changed and still obtain the desired structure at the end of the fabrication process. For example, one can start the fabrication process by removing a portion of the optional substrate layer 104 and subsequently removing the insulating layer 103b from the back side using wet etch techniques such as silicon oxide etchants or dry etch techniques such as RIE. At this stage, the cross section of the actuator is shown in FIG. 13F. A masking layer 105 is then deposited and patterned as shown in FIG. 13G. Layers 102a, 103a and 102b are then etched and the masking layer 105 is subsequently removed as shown in FIG. 13H.

A pn-based vertical electrostatic actuator can be fabricated using the described fabrication methods (FIGS. 13A–H). In this case, the insulating layer 103a is not present and the fabrication sequence is simplified due to the elimination of the etch step of layer 103a.

A method is now described for fabricating a pn-based vertical electrostatic actuator with stationary electrodes that have either a p-type layer or n-type layer removed and mobile electrodes that have a pn-structure. FIGS. 14A–14I show a cross-sectional view of the fabrication process taken along line B of FIG. 2B.

Figure 14A:
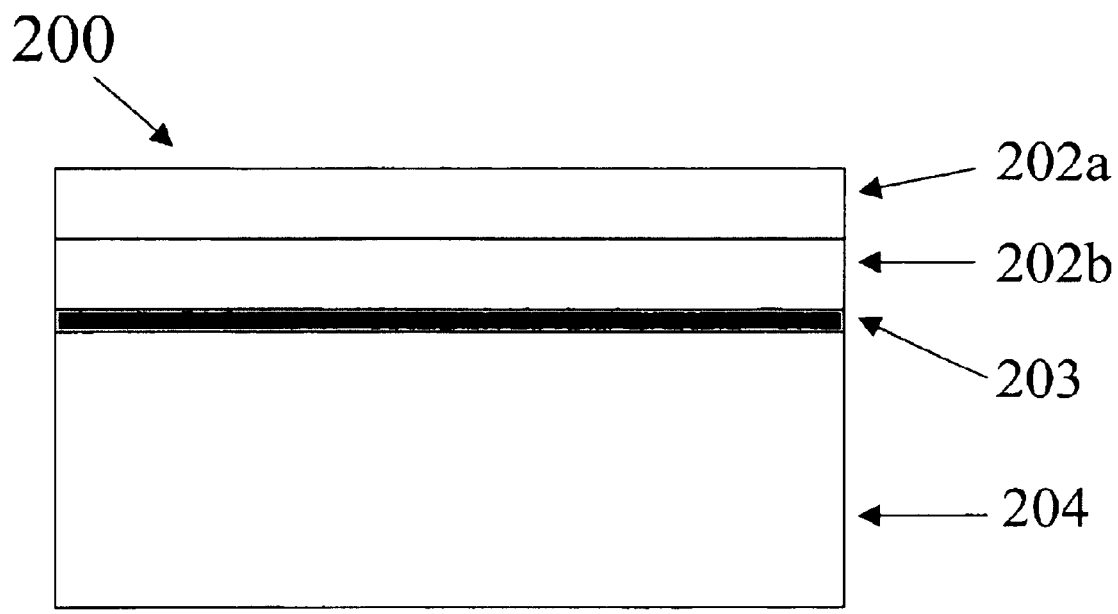
FIGS. 14A–14I show cross-sectional views of the fabrication process of pn-based vertical electrostatic actuators in accordance with an embodiment of the invention.

FIG. 14A shows a cross-sectional view of a substrate that has a first conducting and/or semiconducting layer 202, an optional insulating layer 203, and an optional substrate 204. Layer 202 can be single crystalline silicon and may consist of a p-type layer 202a on top of a n-type layer 202b. Insulating layer 203 is preferably thermally grown silicon oxide. Substrate layer 204 can be silicon.

Figure 14B:
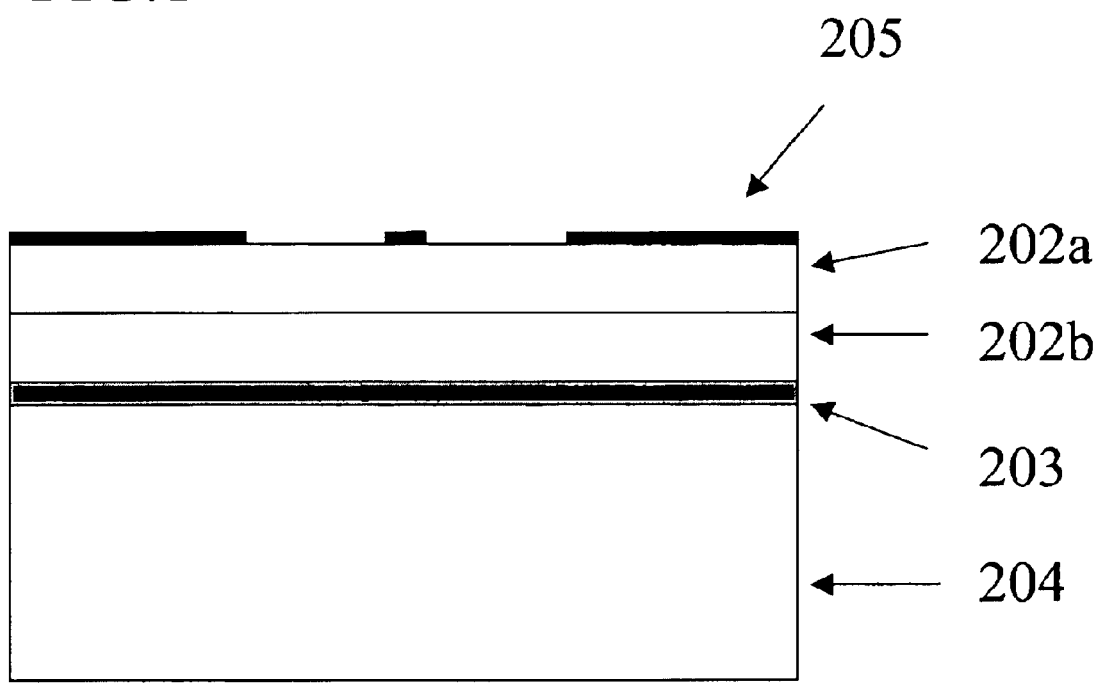
Figure 14C:
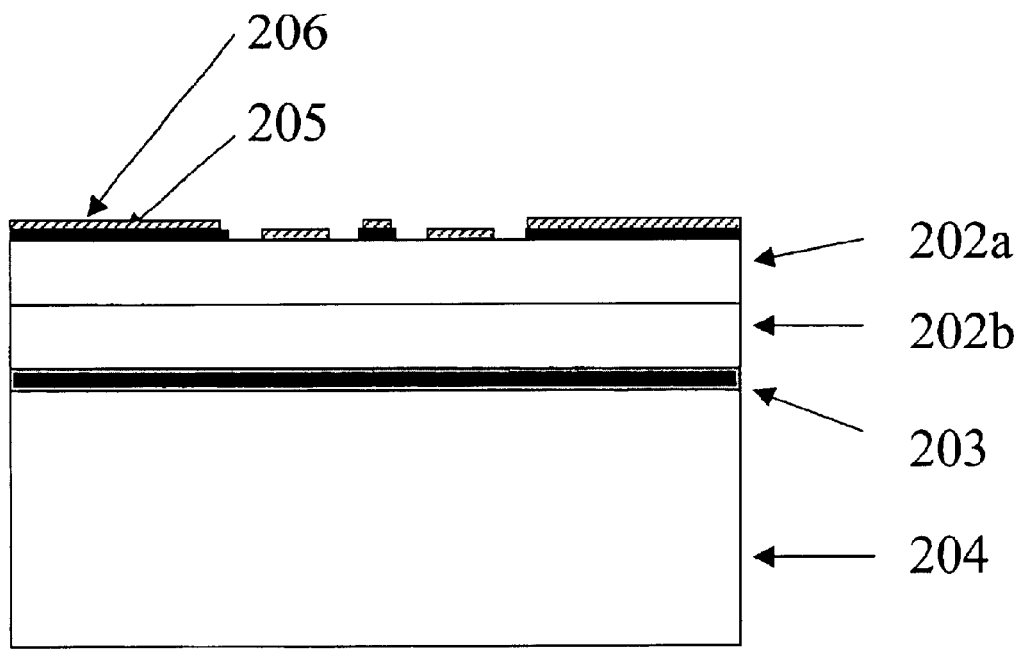
Figure 14D:
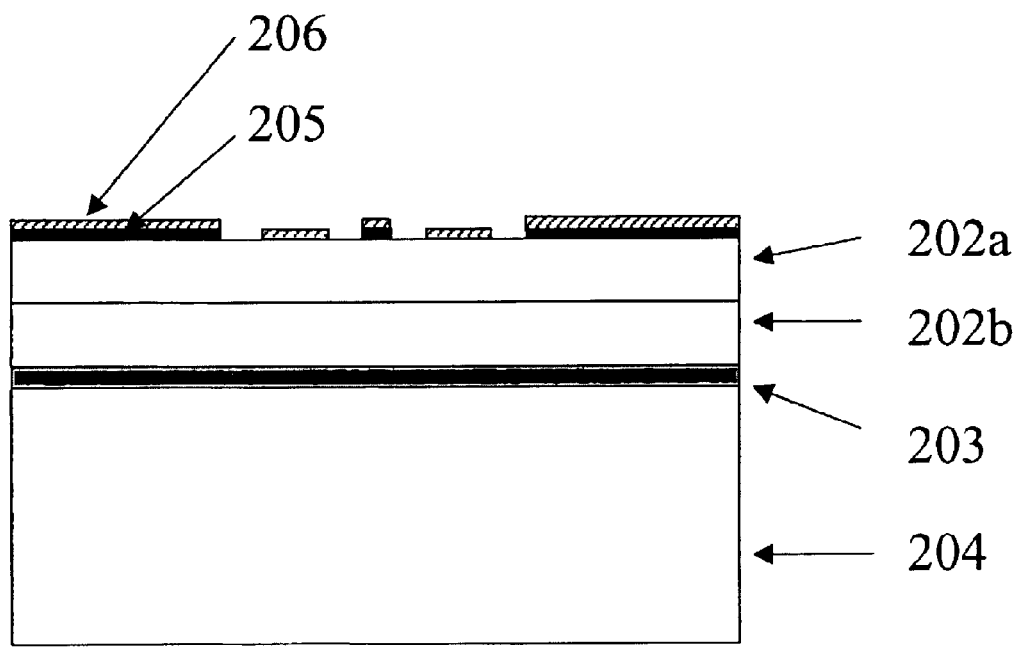
Figure 14E:
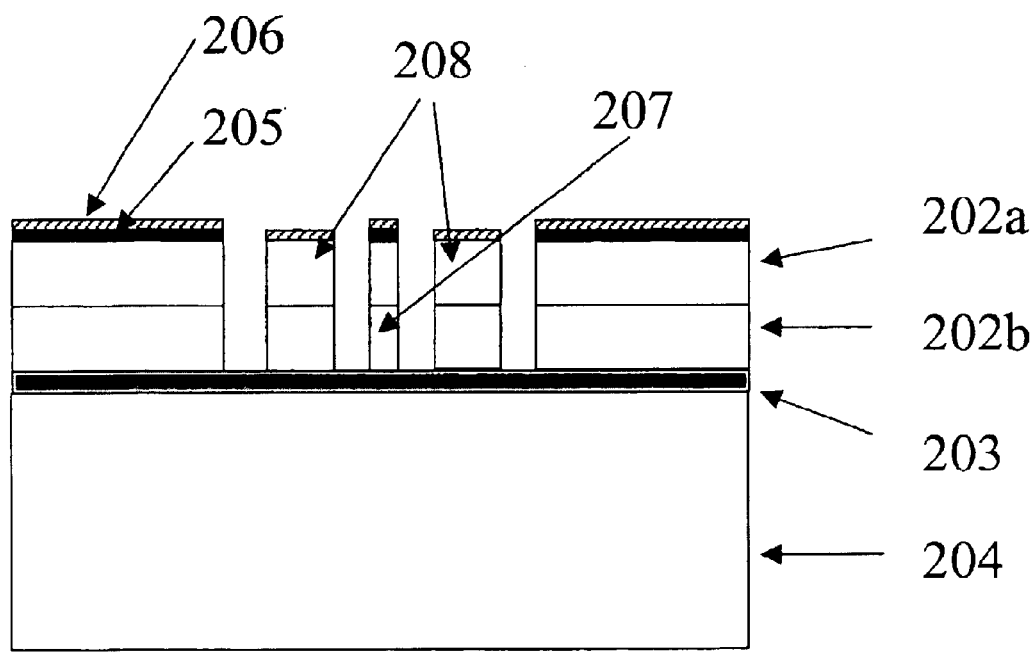
Figure 14F:
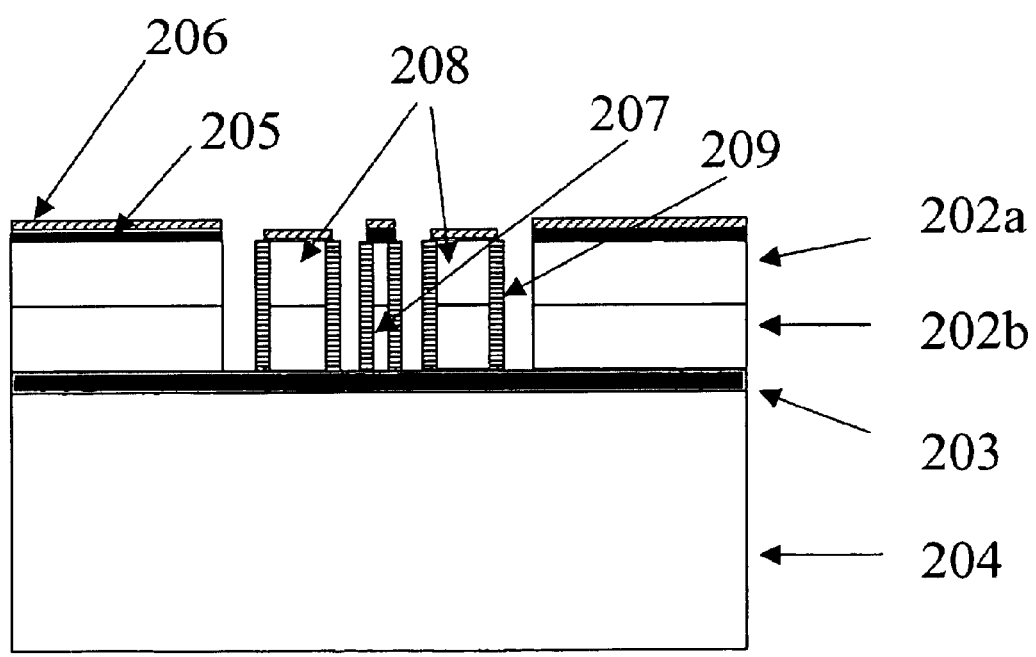
Figure 14G:
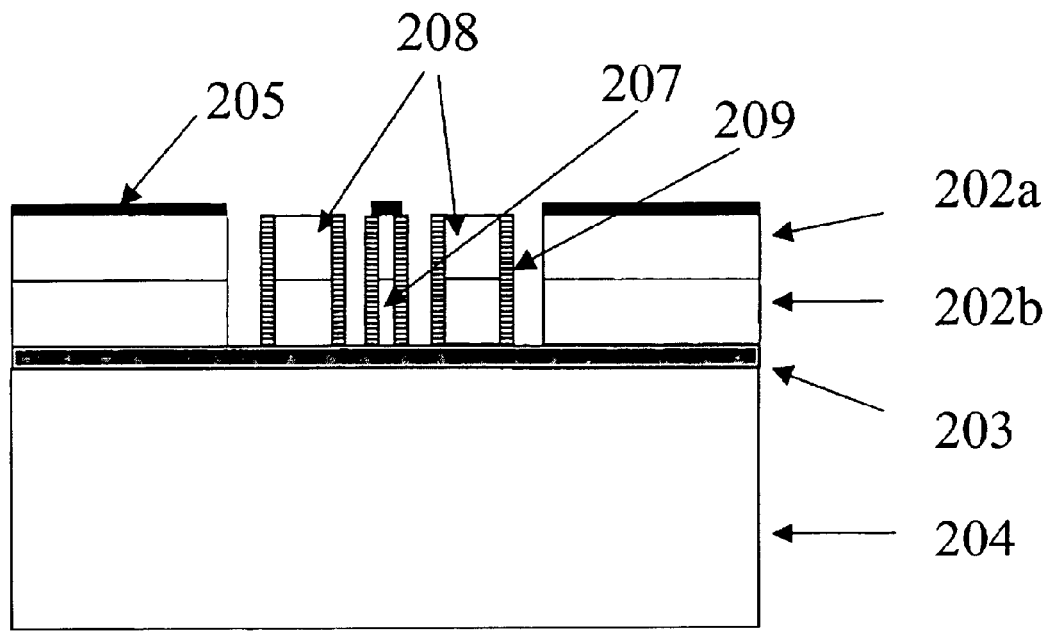
Figure 14H:
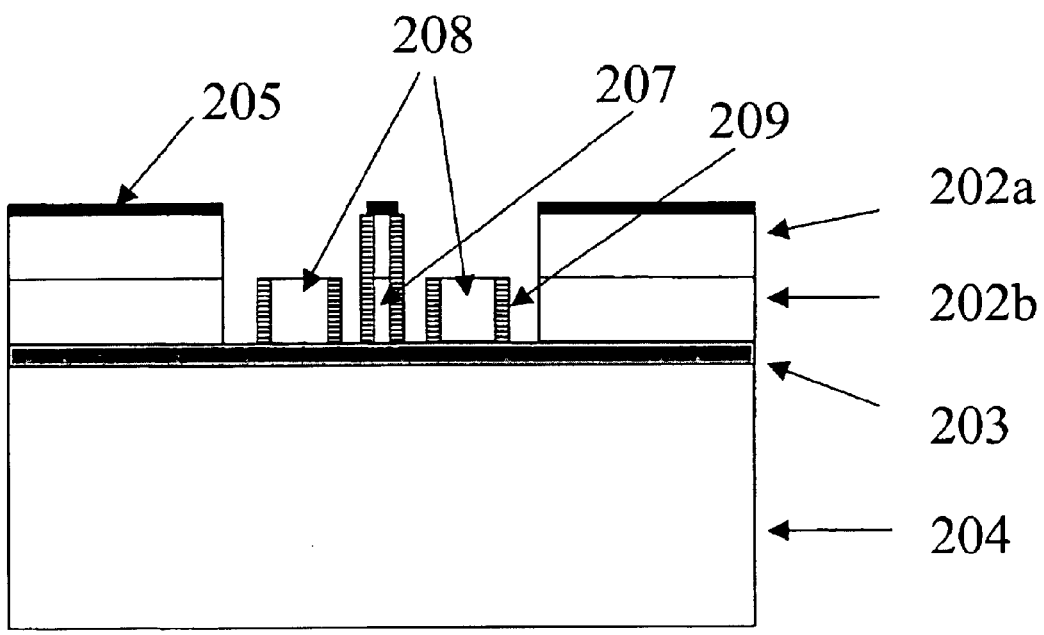

FIG. 14B shows a masking layer 205 such as silicon oxide, which protects mobile electrodes that have a pn-structure during the etching of either a p-type layer or n-type layer of the stationary electrodes. This layer 205 is deposited on top of layer 202a. Another masking layer 206 such as photoresist or silicon nitride is deposited on top of first masking layer 205 and patterned as shown in FIG. 14C. In order to eliminate or reduce misalignment effects, the size of a first masking layer 205 is made larger in comparison to that of a second masking layer 206. Areas of first masking layer 205, which are not covered by a second masking layer 206 are selectively removed without affecting the second masking layer 206 as shown in FIG. 14D. A patterned masking layer 206 defines the electrodes and misalignment between first 205 and second 206 masking layers has no impact on the electrode size or gap between mobile and stationary electrodes. FIG. 14E shows a cross-sectional view of a mobile electrode 207 and stationary electrodes 208a and 208b after etching layers 202a and 202b in the areas that have no masking protection. As shown in FIG. 14F, a third masking layer 209 is deposited or grown on the electrodes sidewalls in order to protect them during the next etch step. For example, a third masking layer 209 such as silicon oxide can be thermally grown on the sidewalls. In this case, the masking layers 205 and 206 should be compatible with the third masking process. The masking layer 206 is selectively removed as shown in FIG. 14G using appropriate etch techniques without impacting masking layers 205 and 209. A wet etch process such electrochemical KOH etch process can be used to selectively remove a non-masked layer 202a of stationary electrodes 208a and 208b as shown in FIG. 14H.

Figure 14I:
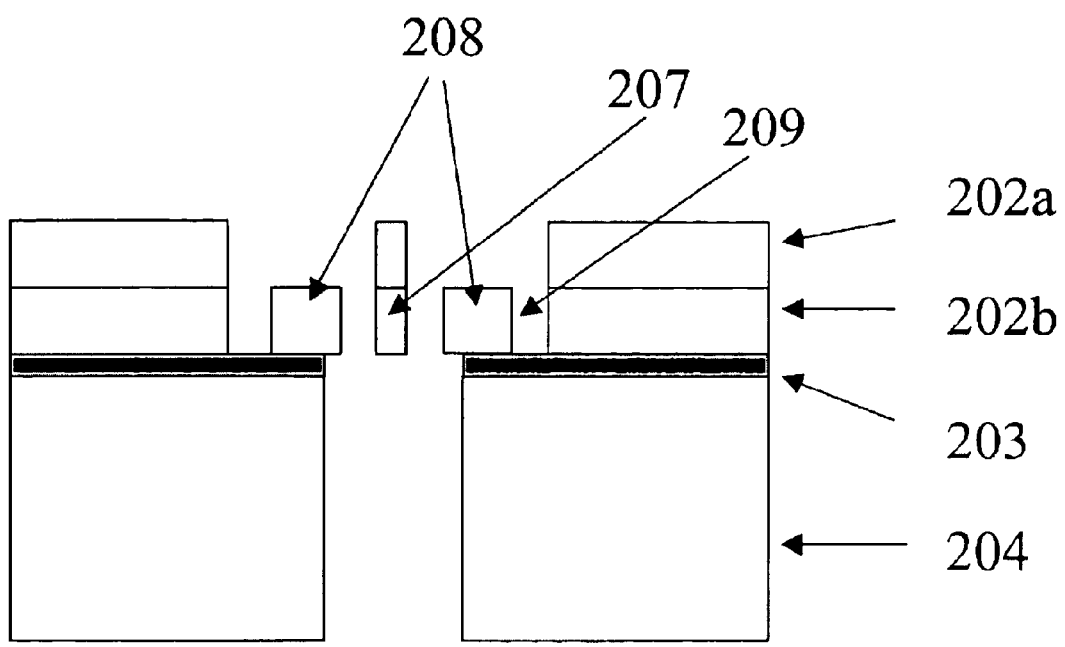

In an electrochemical KOH etch process, one layer 202b is biased in order to protect it during the etch process of a second layer 202a. The remaining masking layers 205 and 209, the optional insulating layer 203 and portion of the optional substrate 204 are removed as shown in FIG. 14I. In this case, the mobile electrode can move toward the stationary electrodes 208a and 208b. This fabrication method can be used to make a pn-based vertical electrostatic actuator with a mobile electrode that has a pn-structure and stationary electrodes that has a either a p-type layer or n-type layer removed.

A method similar to the one above is now described for fabricating a vertical electrostatic actuator with stationary electrodes that have one conducting/semiconducting layer removed and mobile electrodes that have two conducting layers separated by an insulating layer. FIGS. 15A–15H show a cross-sectional view of the fabrication process taken along line B of FIG. 2B.

Figure 15A:
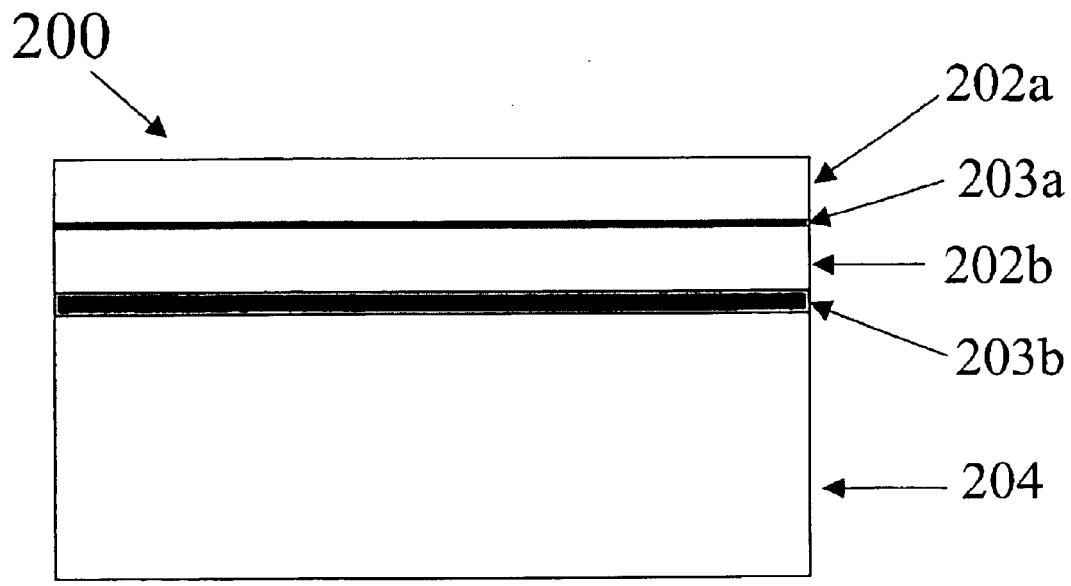
FIGS. 15A–15H show cross-section views of the fabrication process of vertical electrostatic actuators where the number of conducting layers in stationary and mobile electrodes are not the same.

FIG. 15A shows a cross-sectional view of a substrate that has a first conducting and/or semiconducting layer 202a, an insulating layer 203a, an optional second insulating layer 203b, and an optional substrate 204. Layers 202a and 202b are preferably single crystalline silicon. Insulating layers 203a and 203b are preferably thermally grown silicon oxide. Substrate layer 204 can be silicon.

Figure 15B:
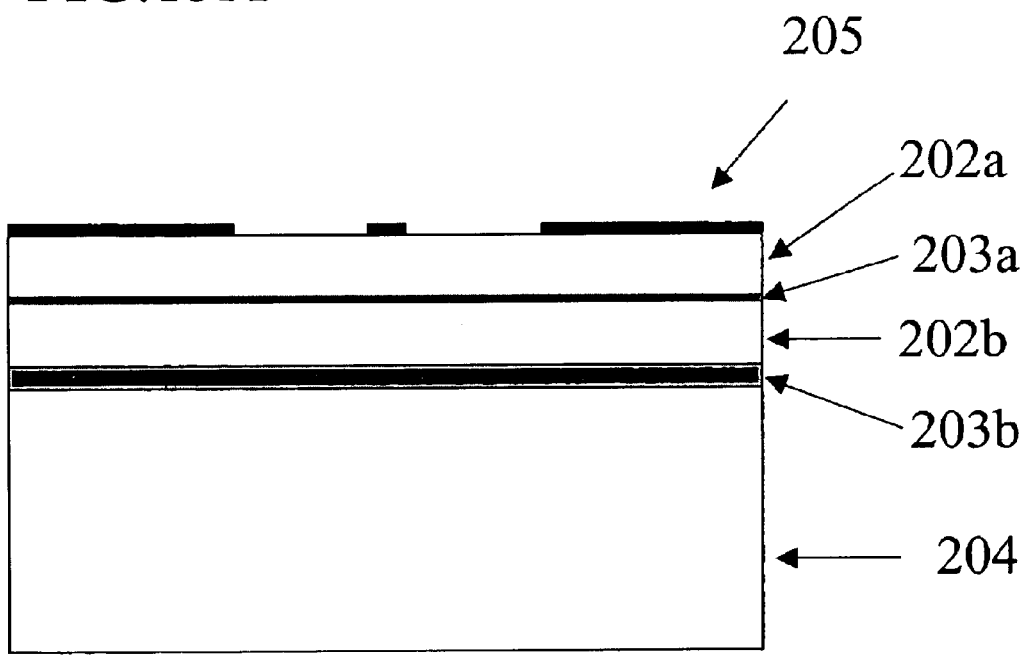
Figure 15C:
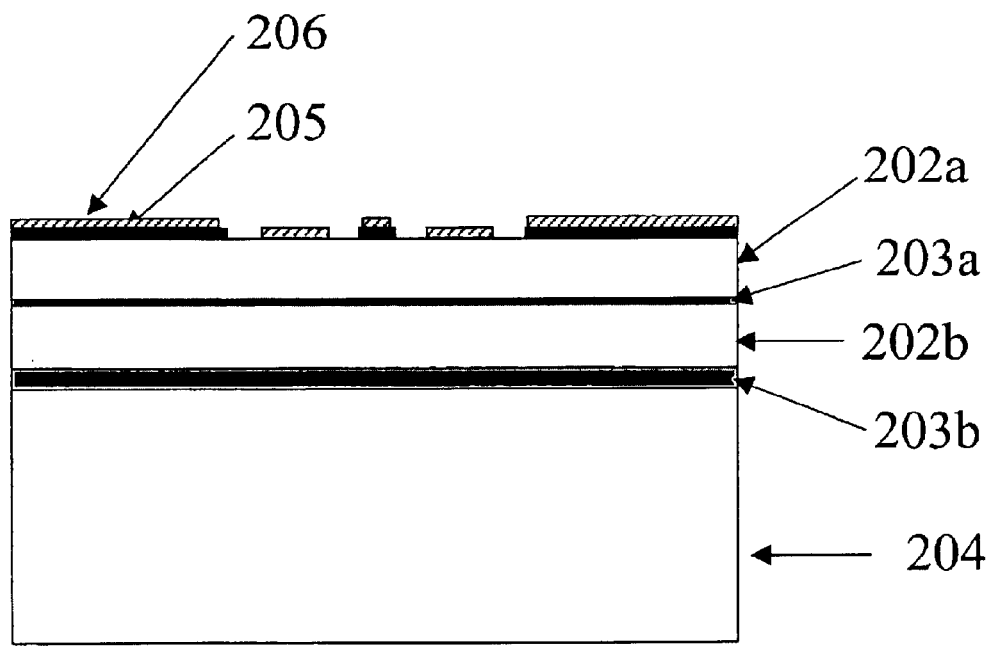
Figure 15D:
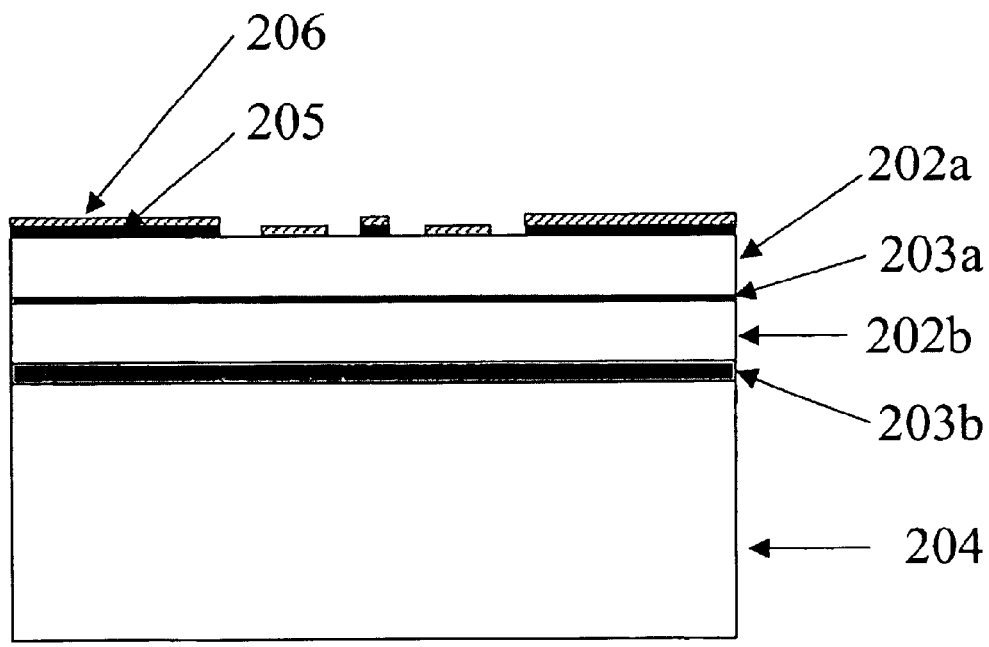
Figure 15E:
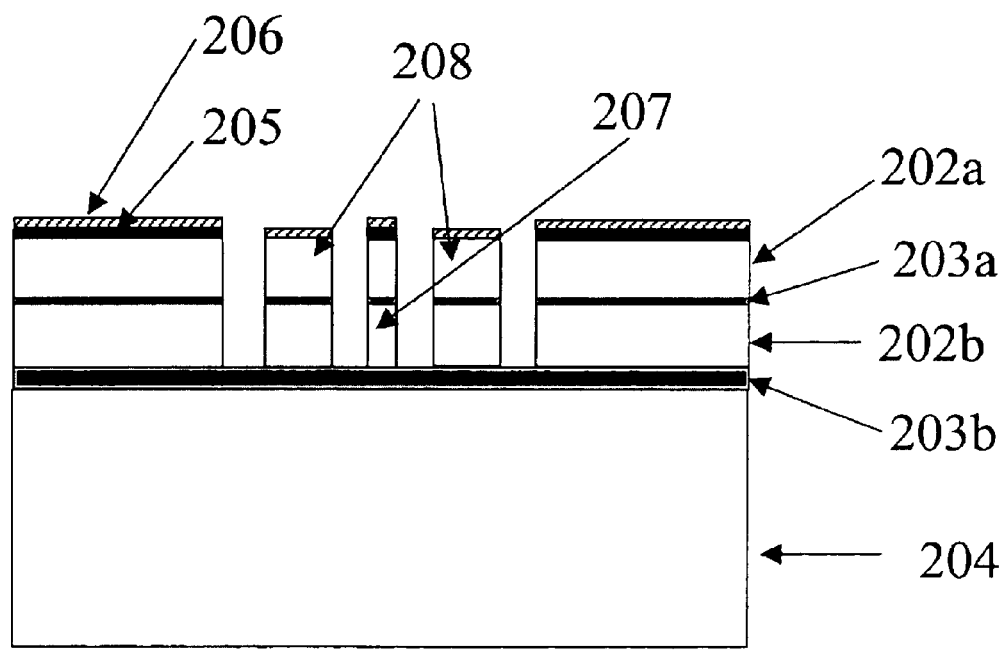
Figure 15F:
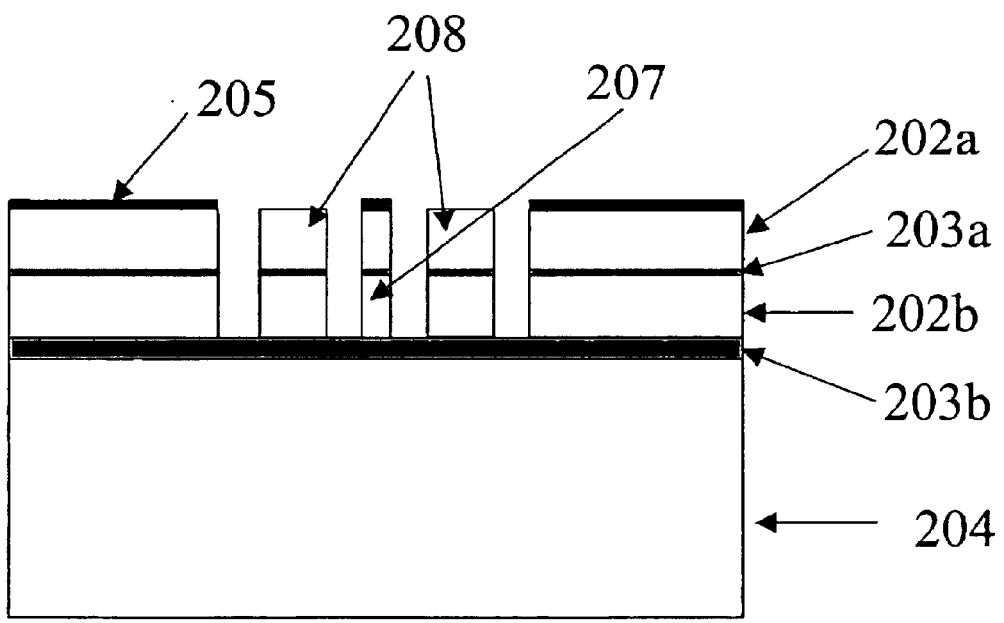
Figure 15G:
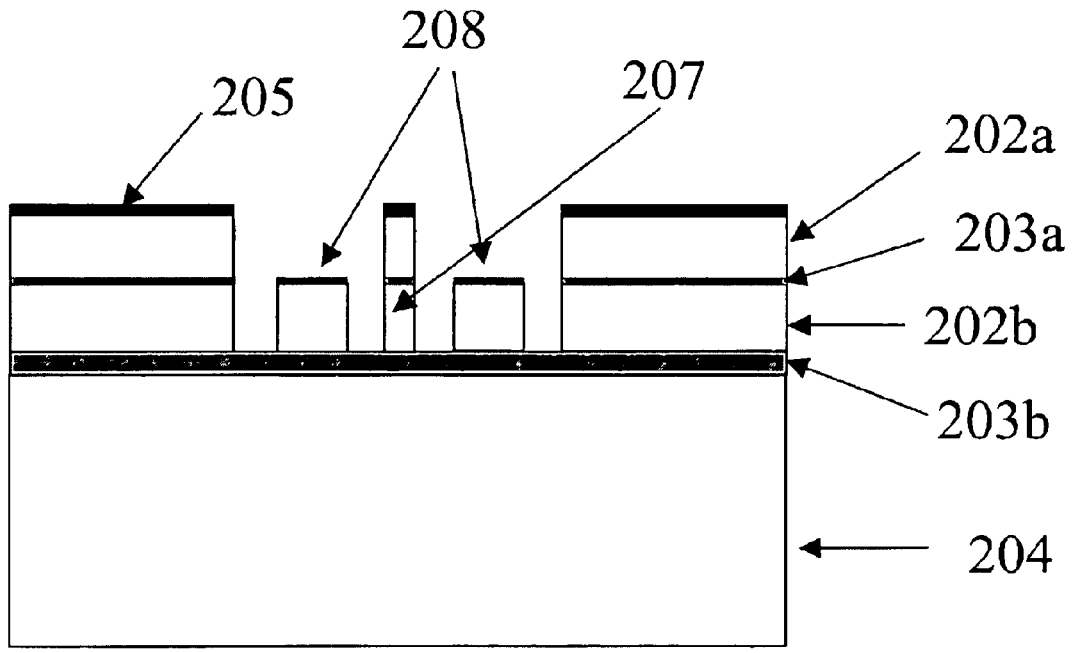

FIG. 15B shows a masking layer 205 such as silicon oxide, which protects mobile electrodes during the etching of the top conducting layer 202a of the stationary electrodes. This layer 205 is deposited on top of layer 202a. Another masking layer 206 such as photoresist or silicon nitride is deposited on top of first masking layer 205 and patterned as shown in FIG. 15C. Areas of first masking layer 205, which are not covered by a second masking layer 206 are selectively removed without affecting the second masking layer 206 as shown in FIG. 15D. In case that layer 206 gets etched during the etch of layer 205, thickness of layer 206 can be made large enough so that the remaining part of it provides a masking layer for the entire etch step of layer 202. A patterned masking layer 206 defines the electrodes and misalignment between first 205 and second 206 masking layers has no impact on the electrode size or gap between mobile and stationary electrodes. FIG. 15E shows a cross-sectional view of a mobile electrode 207 and stationary electrodes 208a and 208b after etching layers 202a and 202b in the areas that have no masking protection. The masking layer 206 is selectively removed as shown in FIG. 15F using appropriate etch techniques without impacting masking layers 205. As shown in FIG. 15G, non-masked layer 202a of stationary electrodes 208a and 208b is etched using suitable etch techniques such as silicon RIE or silicon deep RIE. In this case, the insulating layer 203a acts as an etch stop and protects layer 202b of stationary electrodes 208a and 208b from getting etched.

Figure 15H:
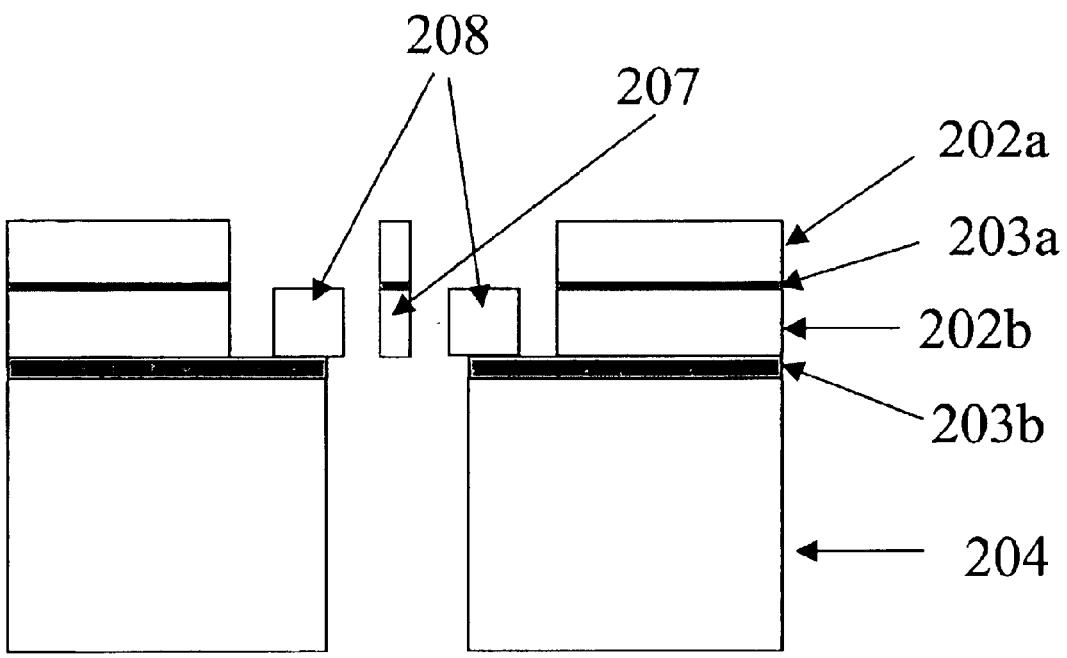

The remaining masking layers 205 and exposed insulating layer 203a of stationary electrodes 208a and 208b, the optional insulating layer 203b and portion of the optional substrate 204 are removed as shown in FIG. 15H. The mobile electrode is released at this point and can move toward the stationary electrodes 208a and 208b.

A method for fabricating a micro-mirror system employing vertical electrostatic actuators including comb-drive actuators is now described. FIGS. 16A–16F show schematic views of the fabrication process.

Figure 16A:
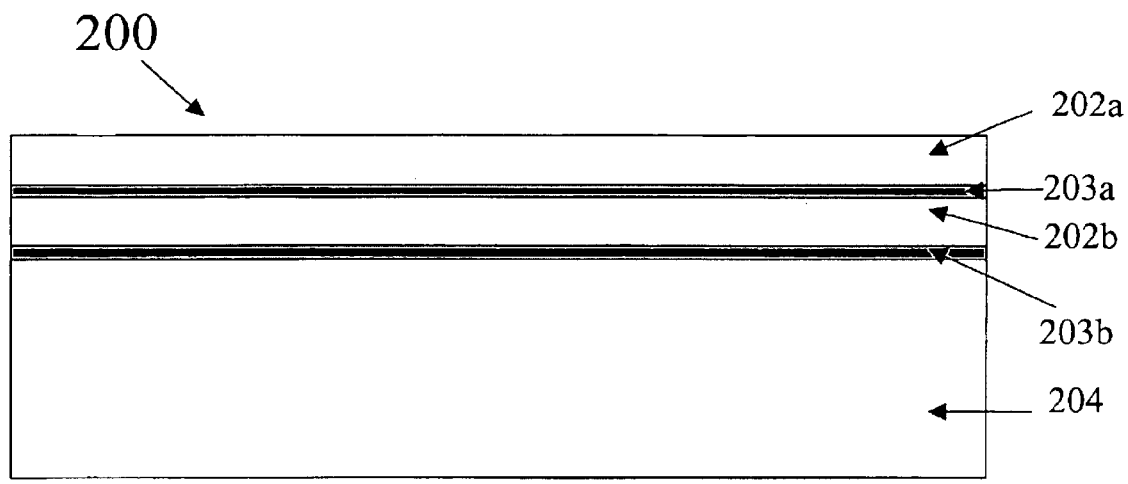
FIGS. 16A–16K show cross-section and plan views of the fabrication process of a micro-mirror system in accordance with an embodiment of the invention.
Figure 16B:
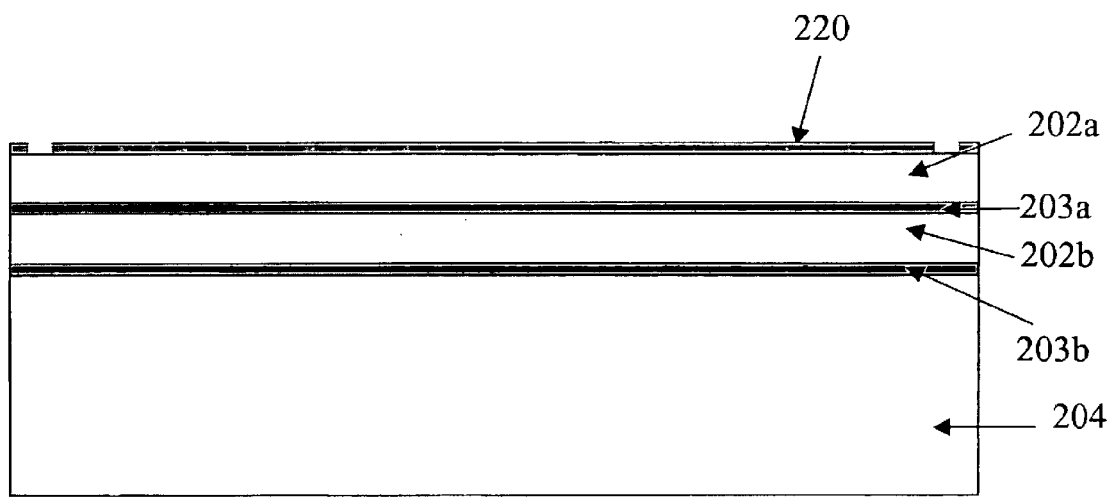
Figure 16C:
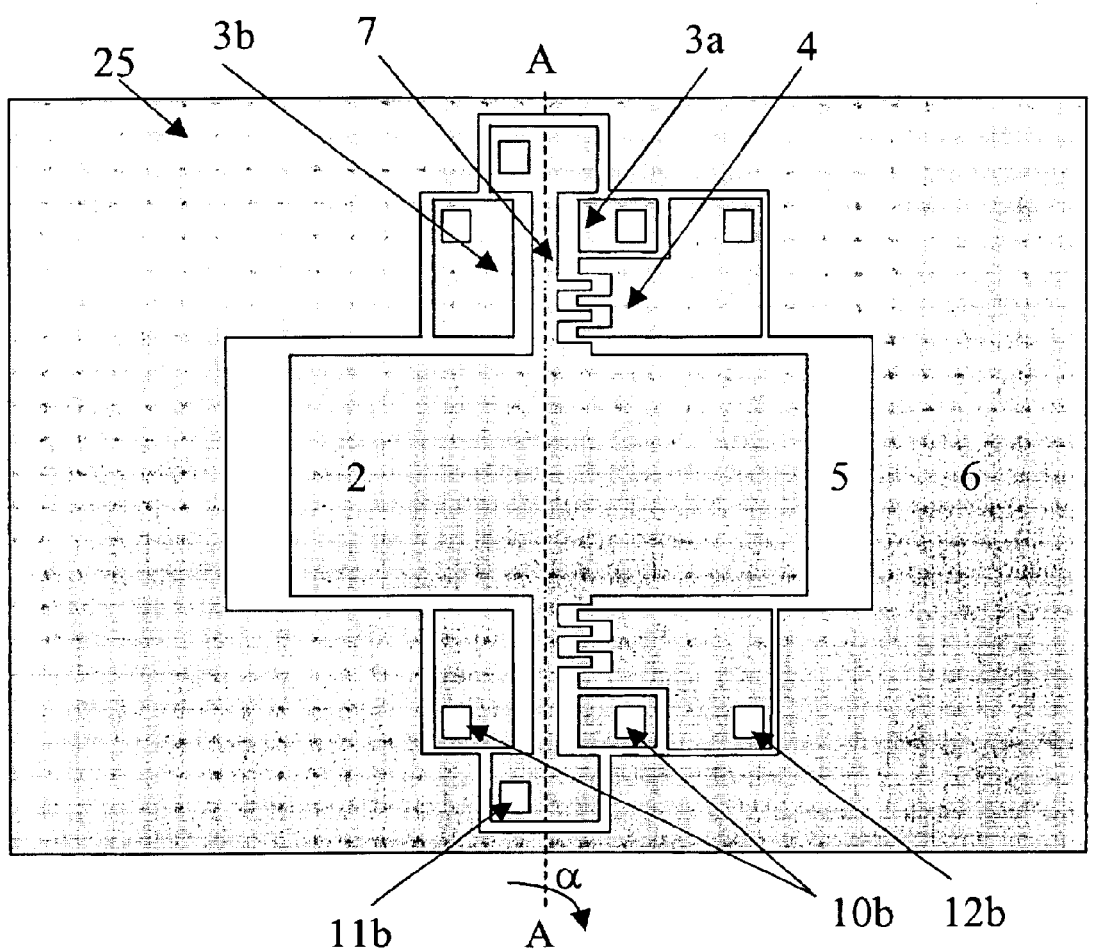

FIG. 16A shows a cross-sectional view 200 of a substrate along centerline A of FIG. 16C. A first conducting and/or semiconducting layer 202a, a second conducting and/or semiconducting layer 202b, an insulating layer 203a, an optional second insulating layer 203b, and an optional substrate 204 are shown in FIG. 16A. For example, insulating layer 203a can be a reverse-biased pn junction, insulating air gap, or silicon oxide.

Layers 202a and 202b can be single crystalline silicon. Insulating layers 203a and 203b are preferably thermally grown silicon oxide. Substrate layer 204 can be silicon. For such silicon-on-insulator structures, standard Integrated Circuits (IC) fabrication tools such as photolithography, Reactive Ion Etching (RIE), deep RIE, doping, diffusion, annealing, ion implantation, metal deposition, and growth and deposition of silicon oxide, silicon nitride, etc. can be used in the fabrication process.

A masking layer 220 such as silicon oxide is deposited on top of layer 202 and patterned as shown in FIG. 16B. Layer 220 covers the whole device except areas that need to be etched later on. Thus, layer 220 provides protection for the underlying layers during the etching of the exposed areas.

Figure 16D:
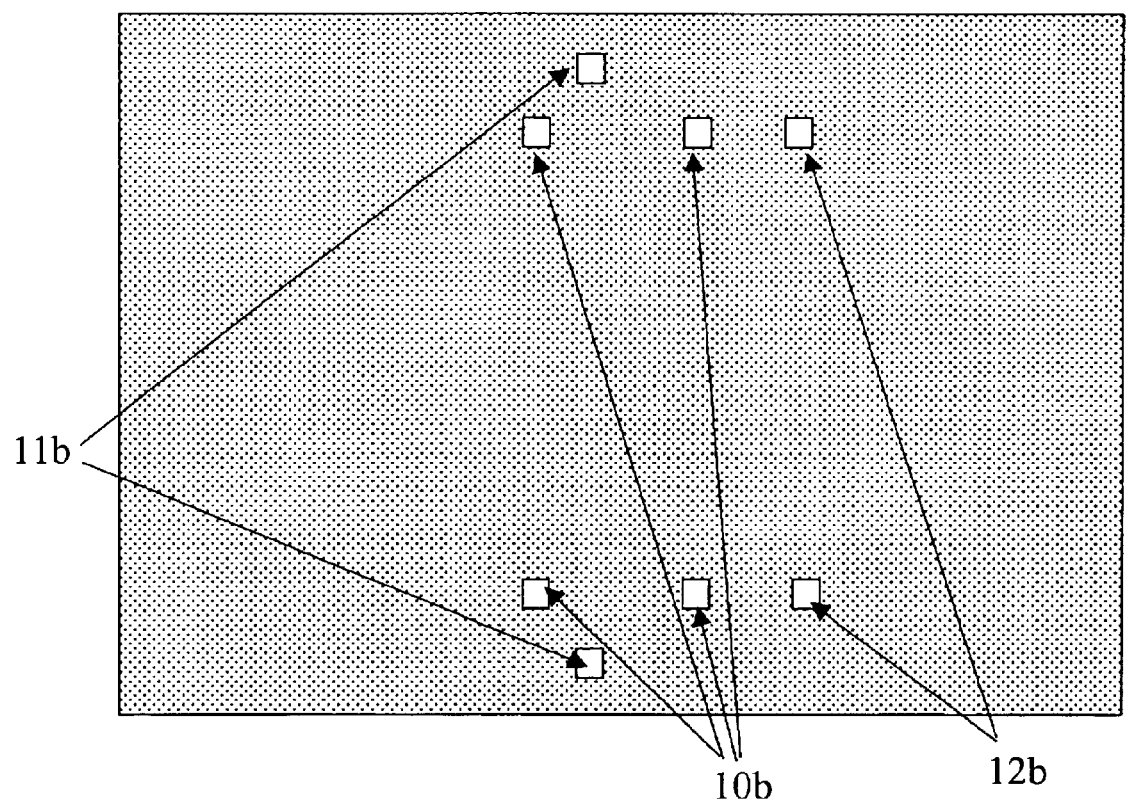

A plan view of the micro-mirror system showing the patterned layer 220 is shown in FIG. 16C. The patterned layer 220 includes a comb-drive actuator 4, such as one disclosed in a U.S. application Ser. No. 10/315,366, as well as a vertical electrostatic actuator, such as one described herein. A second masking layer 221 is deposited on top of layer 220 and then patterned leaving this layer 221 every where except in areas 10a, 11a and 12a as shown in FIG. 16D.

Figure 16E:
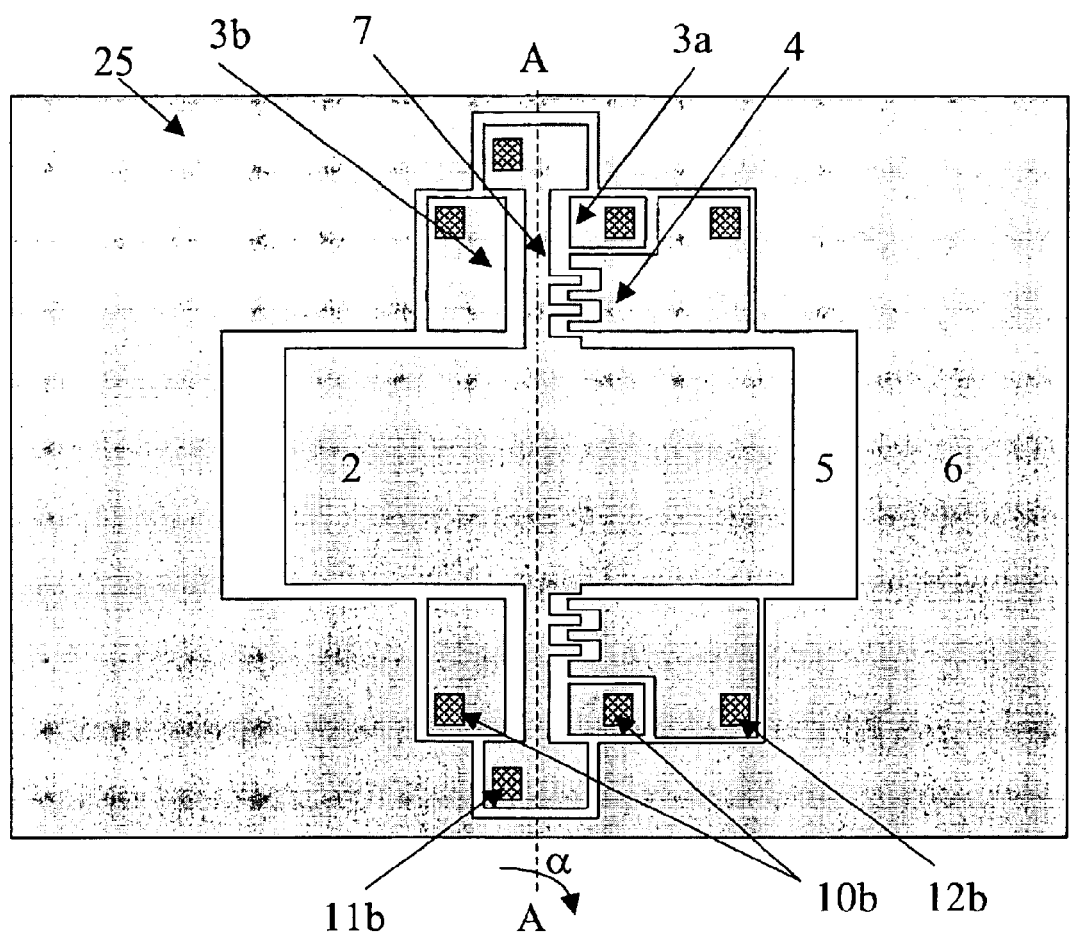
Figure 16F:
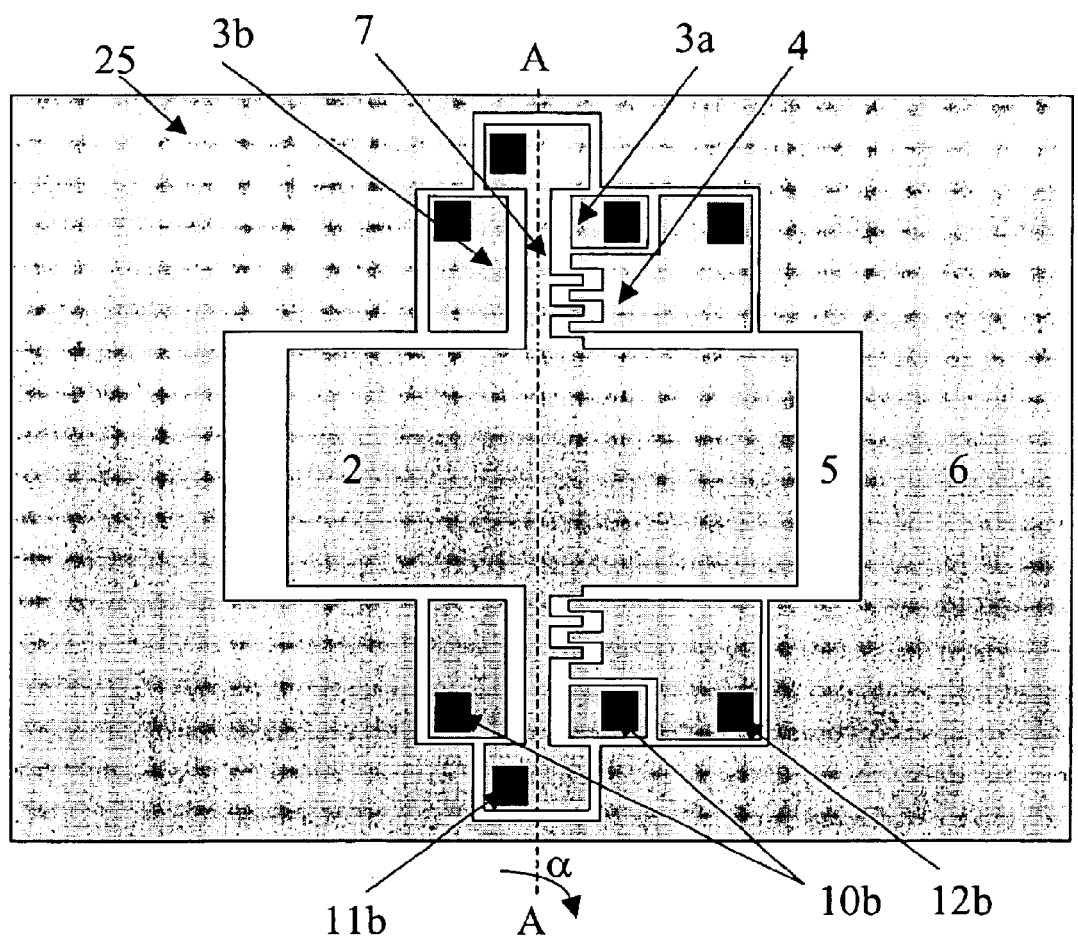

As shown in FIG. 16E, layer 202a and 203a are completely etched in the exposed areas 10b, 11b and 12b followed by a selective removal of the masking layer 221 without impacting patterned layer 220. A third masking layer 222 such as Al, Ni or photoresist is deposited on top of layer 220 and then patterned so that layer 222 covers areas 10b, 11b and 12b and their edges completely as shown in FIG. 16F. Considering misalignment error during photolithography, patterned areas of layer 222 corresponding to areas 10b, 11b and 12b should be larger than these areas by a value equal or larger than the misalignment error.

Figure 16G:
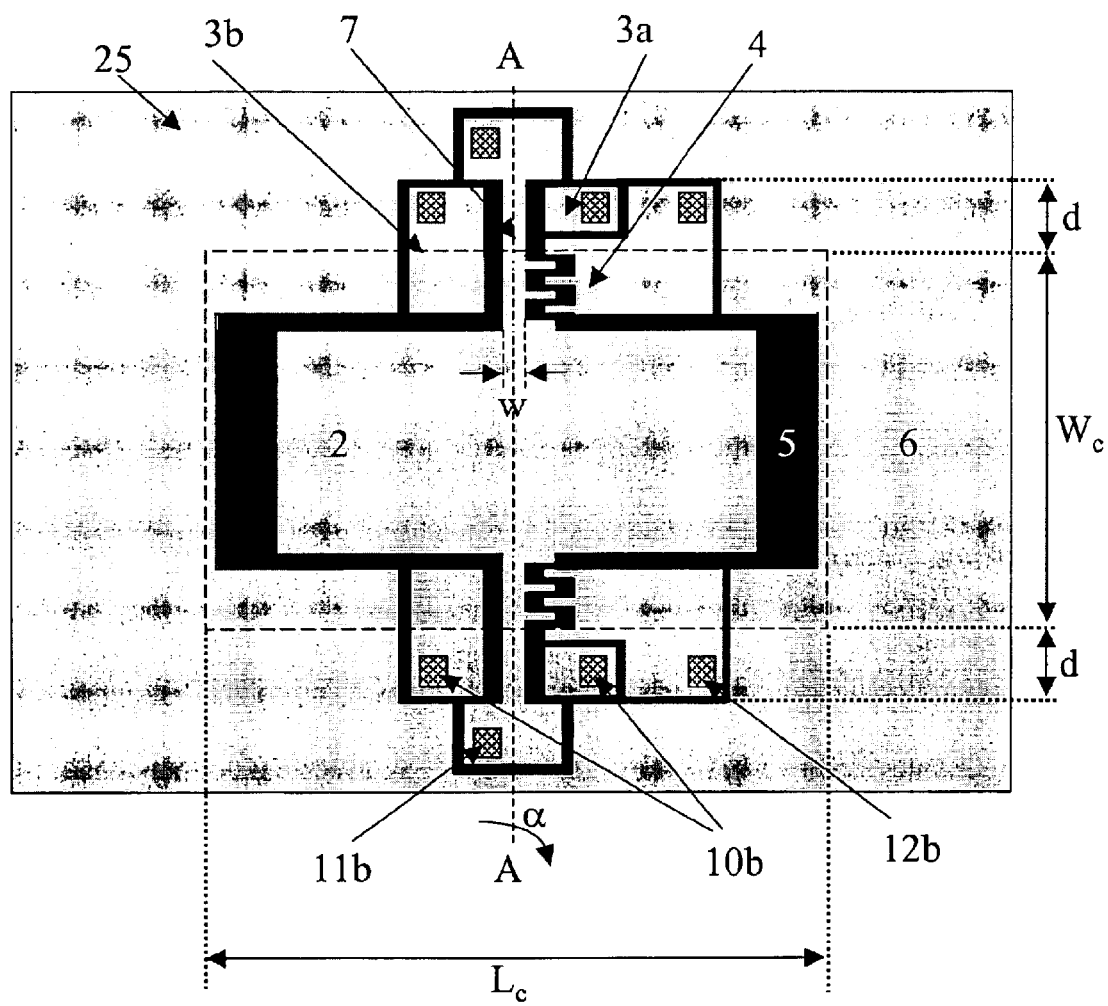
Figure 16H:
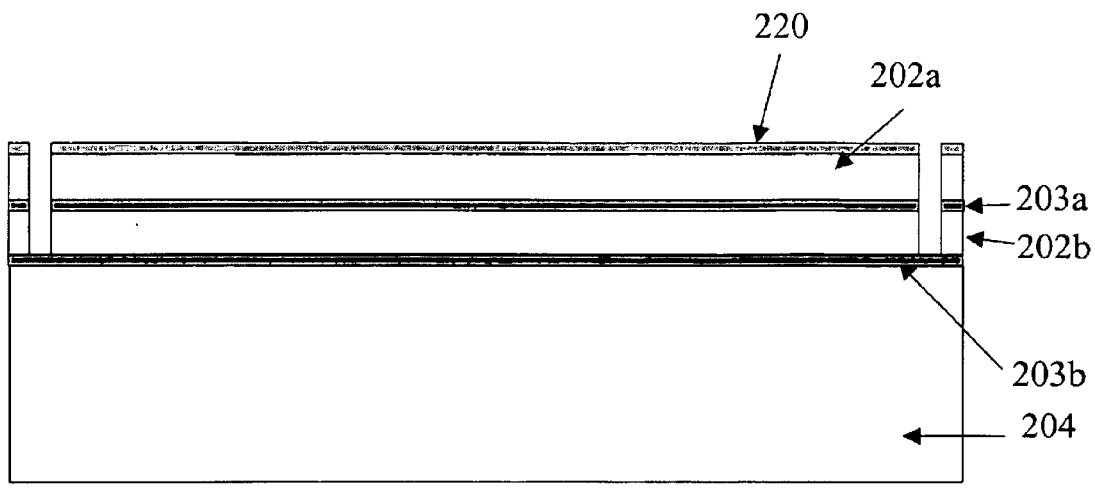

In FIG. 16G, layers 202a, 203a and 202b are completely etched away in the exposed areas (areas in black color) followed by a selective removal of third masking layer 222. FIG. 16H shows a cross section of FIG. 16G along centerline A.

Figure 16I:
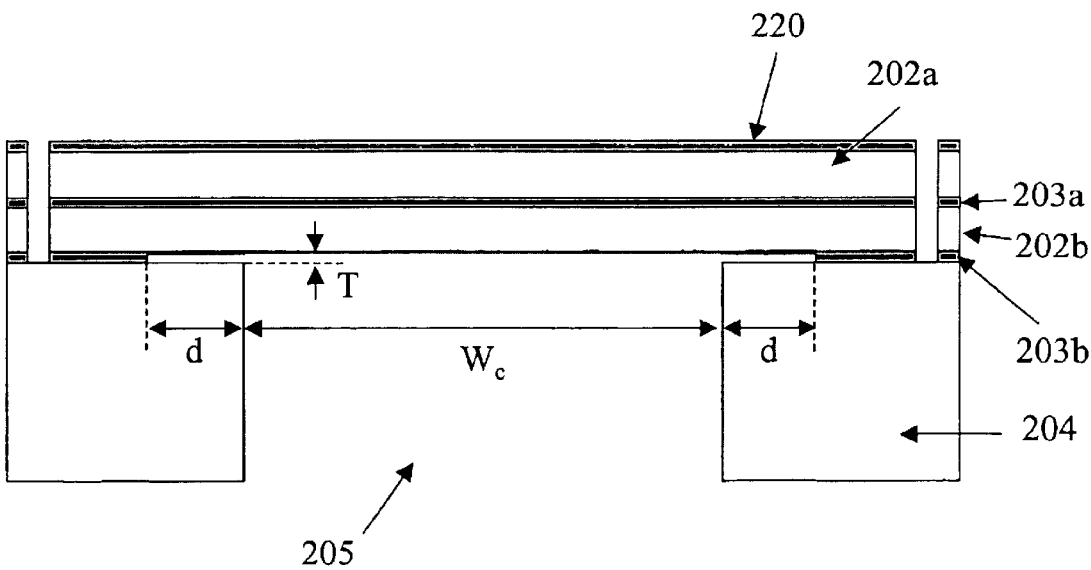
Figure 16J:
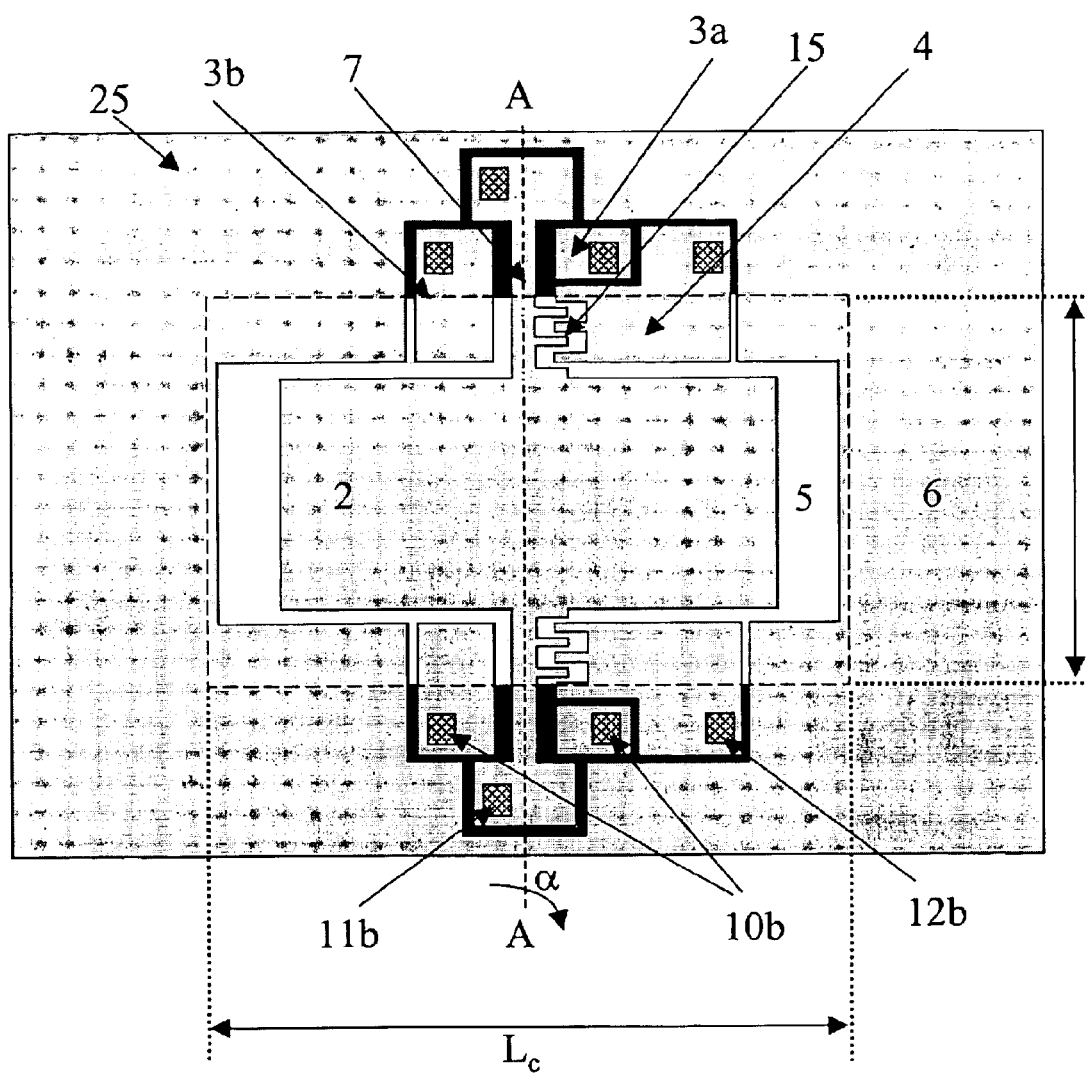

In FIGS. 16I–16J, a cross section and plan views are shown where a portion of the optional substrate 204 and a portion of the insulating layer 203b are etched away to release the bottom surface of both the mirror support 2, flexure 7 and comb fingers 15. The exposed portion of the insulating layer 203b can be etched away either by isotropic etching or anisotropic etching. On the other hand, unexposed portion of insulating layer 203b, which is located between flexure 7 and substrate 204 along portion d of flexure 7 (FIG. 16I), can be removed through isotropic etching where this layer is attacked by etchant through openings on both sides of flexure 7.

Portion d of flexure 7 can rotate about axis A to a maximum angle of rotation a given by $\sin(\alpha)=[2T/w]$, where T is the thickness of insulating layer 203b and $w$ is the width of flexure 7.

Figure 16K:
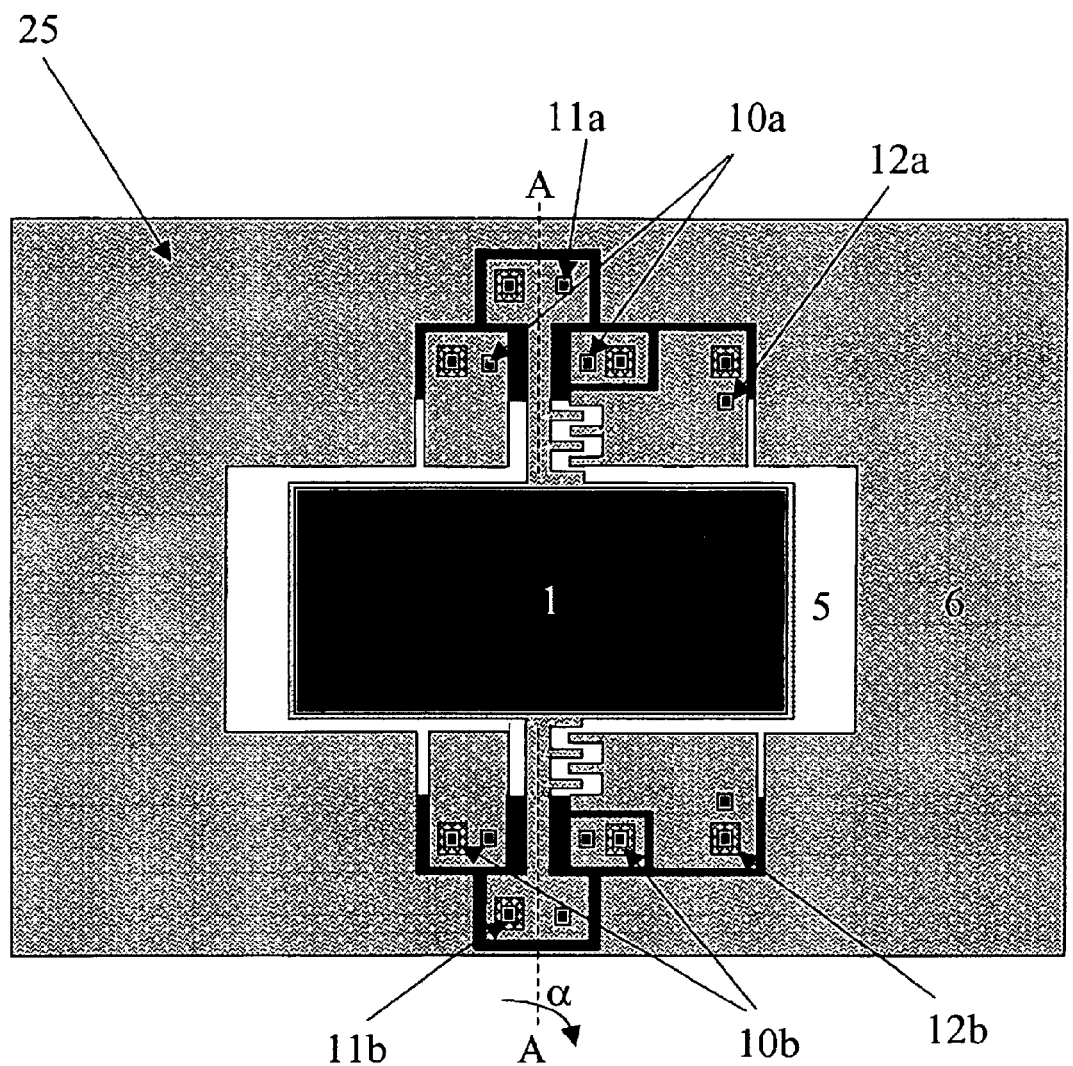

In FIG. 16K, masking layer 220 is removed and metal contacts 10a, 11a, and 12a to the top layer 202a, metal contacts 10b, 11b, and 12b to the bottom layer 202b, and a reflective mirror layer 1 are deposited and patterned. For example, deposition techniques such as sputtering, e-beam and/or thermal evaporation can be used. Metal contacts 10, 11 and 12 are preferably AlSi and/or AlSiCu for p-type and heavily doped n-type silicon. Mirror layer 1 can be Al or Au. It is possible to alter the fabrication sequence of FIGS. 16A–K. For example, one can start with fabrication steps related to the backside of the wafer followed by fabrication steps related to the front side of the wafer.

The fabrication method shown in FIGS. 16B–16K can be used to fabricate micro-mirror systems which have pn-based structure. As shown in FIG. 14A, a pn-based structure may consist of a p-type layer 202a, n-type layer 202b, an optional insulating layer 203 and an optional substrate 204. In this case, the fabrication steps related to etching insulating layer 203a of FIG. 16A are not needed.

These fabrication methods can be used to make uni-axial and multi-axial actuators and micro-mirror systems using combinations of electrostatic actuators disclosed herein and comb-drive actuators.

Uni-axial and multi-axial rotating actuators and micro-mirror systems can be fabricated using various methods including, but not limited to, silicon surface micromachining, silicon bulk micromachining, LIGA, HEXSIL, electroforming of high aspect ratio structures, nano-technology fabrication techniques and combinations of two or more of these methods. In addition, other suitable fabrication methods of vertical comb-drive actuators known in the art can be used to make actuators disclosed herein. Some of these fabrication methods are disclosed in international patent publications WO 01/73934 A2, WO 01/73935 A2, WO 01/73936 A2, WO 01/73937 A2, WO 01/74707 A2 and WO 01/76055 A2 to Behin et al. and are incorporated herein by reference.

The uni-axial and multi-axial rotating actuators and position sensors disclosed herein have broad applications, including, but not limited to, telecommunication components such as fiber optical switches, switch arrays and optical cross-connects, optical devices for tracking and display, magnetic disk drives, inertial sensors, and biomedical components. Optical switch arrays employing uni-axial and/or bi-axial torsional micro-mirror systems can be used to construct fiber-optical cross-connects with different sizes, such as 1024×1024. The position sensors disclosed herein provide active and precise control of the micro-mirror's angle of rotation resulting in low insertion loss, which can be important in some cross-connects.

While specific embodiments of the present invention have been shown and described, it will be apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

What is claimed is:

1. An electrostatic actuator for use in a micro-mechanical system, comprising:

a mobile electrode formed on a flexure, the mobile electrode having a first layer electrically insulated from a second layer; and stationary electrodes located on either side of the mobile electrode so that there are gaps between the mobile electrode and each of the stationary electrodes, each of the stationary electrodes having a first layer electrically insulated from a second layer;

wherein applying one or more voltages to the first and second layers of mobile and stationary electrodes causes attraction between the respective layers of the mobile and stationary electrodes for rotating the flexure about its axis.

2. The electrostatic actuator of claim 1, wherein the first and second layers of the mobile and stationary electrodes comprise a conducting material.

3. The electrostatic actuator of claim 2, wherein the mobile and stationary electrodes each comprise an insulating layer between the first and second layers.

4. The electrostatic actuator of claim 1, wherein the first layers of the mobile and stationary electrodes comprise a p-type semiconducting material and the second layers of the mobile and stationary electrodes comprise an n-type semiconducting material.

5. The electrostatic actuator of claim 4, wherein the p-type and n-type semiconducting materials form a pn-structure in each of the mobile and stationary electrodes.

6. The electrostatic actuator of claim 5, further comprising:
means for applying the voltages to the mobile and stationary electrodes to vary the size of the depletion region of the pn-structure of at least one of the electrodes.

7. The electrostatic actuator of claim 5, further comprising:
means for reverse biasing the pn-structure of at least one of the electrodes.

8. The electrostatic actuator of claim 1, wherein at least one of the gaps varies over the length of the flexure.

9. The electrostatic actuator of claim 1, wherein the flexure is necked down at one end.

10. A micro-mechanical system, comprising:
a base;
a rotatable element;
a flexure, connected to the rotatable element and the base; extending along a rotational axis of the rotatable element;
a vertical electrostatic actuator comprising a mobile electrode integrated as part of the flexure and at least one stationary electrode located on the base; and
a comb-drive actuator formed on the rotatable element and the base.

11. The micro-mechanical system of claim 10, wherein the comb-drive actuator is located along the rotational axis of the rotatable element.

12. The micro-mechanical system of claim 10, wherein the comb-drive actuator is located off of the rotational axis of the rotatable element.

13. The micro-mechanical system of claim 10, further comprising:
a second comb-drive actuator formed on the rotatable element and the base away from the rotational axis of the rotatable element.

14. The micro-mechanical system of claim 10, wherein the vertical electrostatic actuator comprises:
the mobile electrode having a first layer electrically insulated from a second layer; and
stationary electrodes located on either side of the mobile electrode so that there are gaps between the mobile electrode and each of the stationary electrodes, each of the stationary electrodes having a first layer electrically insulated from a second layer;
wherein applying one or more voltages to the first and second layers of mobile and stationary electrodes causes attraction between the respective layers of the mobile and stationary electrodes for rotating the flexure about its axis.

15. The micro-mechanical system of claim 14, wherein the first and second layers of the mobile and stationary electrodes comprise a conducting material.

16. The micro-mechanical system of claim 14, wherein the mobile and stationary electrodes each comprise an insulating layer between the first and second layers.

17. The micro-mechanical system of claim 14, wherein the first layers of the mobile and stationary electrodes comprise a p-type semiconducting material and the second layers of the mobile and stationary electrodes comprise an n-type semiconducting material.

18. The micro-mechanical system of claim 17, wherein the p-type and n-type semiconducting materials form a pn-structure in each of the mobile and stationary electrodes.

19. The micro-mechanical system of claim 18, further comprising:
means for applying the voltages to the mobile and stationary electrodes to vary the size of the depletion region of the pn-structure of at least one of the electrodes.

20. The micro-mechanical system of claim 18, further comprising:
means for reverse biasing the pn-structure of at least one of the electrodes.

21. The micro-mechanical system of claim 14, wherein at least one of the gaps varies over the length of the flexure.

22. The micro-mechanical system of claim 10, wherein the flexure is necked down at one end.

23. The micro-mechanical system of claim 10, further comprising a feedback system.

24. The micro-mechanical system of claim 10, further comprising a sensor system.

25. A method of fabricating an electrostatic actuator, comprising:
providing a substrate;
forming a first insulating layer over the substrate;
forming a first conductive layer over the first insulating layer;
forming a second insulating layer over the first conductive layer;
forming a second conductive layer over the second insulating layer;
depositing a mask on the second conductive layer that defines mobile and stationary electrodes of the electrostatic actuator;
removing the unmasked portions of first and second conductive layers and the second insulating layer; and
removing portions of the first insulating layer to release the mobile electrode from the substrate.

26. The method of claim 25, further comprising:
removing a portion of the substrate below the mobile electrode.

27. A method of fabricating an electrostatic actuator, comprising:
providing a substrate;
forming an insulating layer over the substrate;
forming a first semiconductor layer over the insulating layer;
forming a second semiconductor layer over the first semiconductor layer, the second semiconductor layer being a type different from the first semiconductor layer so as to form a pn-structure;
depositing a first mask on the second semiconductor layer that defines mobile and stationary electrodes of the electrostatic actuator;
depositing a second mask over the first mask;
removing portions of the first mask not covered by the second mask;
removing the unmasked portions of first and second semiconductor layers to form the mobile and stationary electrodes; and
removing portions of the first insulating layer to release the mobile electrode from the substrate.

28. The method of claim 27, further comprising:
removing a portion of the substrate below the mobile electrode.

* * * * *